United States Patent [19]
Buhr et al.

[11] Patent Number: 5,447,811
[45] Date of Patent: *Sep. 5, 1995

[54] COLOR IMAGE REPRODUCTION OF SCENES WITH PREFERENTIAL TONE MAPPING

[75] Inventors: John D. Buhr, Webster; Harry D. Franchino, Fairport, both of N.Y.

[73] Assignee: Eastman Kodak Company, Rochester, N.Y.

[*] Notice: The portion of the term of this patent subsequent to Apr. 5, 2011 has been disclaimed.

[21] Appl. No.: 219,042

[22] Filed: Mar. 23, 1994

Related U.S. Application Data

[63] Continuation-in-part of Ser. No. 950,871, Sep. 24, 1992, Pat. No. 5,300,381.

[51] Int. Cl.⁶ ............... G03C 7/18; G03C 5/40; G03B 27/52
[52] U.S. Cl. .................. 430/20; 430/30; 430/43; 430/200; 430/201; 430/236; 430/359; 430/363; 430/370; 355/32; 355/40; 355/35; 355/77; 358/524; 358/513; 358/332; 358/333; 503/227; 347/101
[58] Field of Search ............ 430/20, 30, 370, 43, 430/359, 363; 346/75; 503/227; 355/32, 40, 35, 77; 358/78, 80, 332, 333

[56] References Cited

U.S. PATENT DOCUMENTS

| | | | |
|---|---|---|---|
| 3,977,872 | 8/1976 | Hellmig | 430/30 |
| 4,259,423 | 3/1981 | Merlo et al. | 430/30 |
| 4,792,518 | 12/1988 | Kuwashima et al. | 430/505 |
| 4,873,428 | 10/1989 | Takeuchi | 250/214 |
| 5,051,341 | 9/1991 | Muenter et al. | 430/359 |
| 5,300,381 | 4/1994 | Buhr et al. | 430/30 |

OTHER PUBLICATIONS

Hunt, *The Reproduction of Colour in Photography, Printing & Television*, 4th Ed., 1987, pp. 49-66.
J. E. Boyd, Digital Image Film Generation—from the Photoscientist's Perspective, Feb. 1982, pp. 15-22.

Primary Examiner—Richard Schilling
Attorney, Agent, or Firm—Arthur E. Kluegel

[57] ABSTRACT

A system and method of image reproduction in color with preferential tone mapping are provided in which the method includes the steps of capturing original scene parameters and creating a visual reproduction of the scene, the method additionally comprising:
performing a transformation of said captured scene parameters, said transformation being such that, taken in conjunction with untransformed characteristics of the capturing and creating steps, it results in a reproduced tone mapping having instantaneous gamma values of viewed reproduction density relative to density of the original scene which are greater than a minimum value of A and less than A plus 0.35 times scene exposure density over a scene exposure density range of from 0.60 to 1.45 as measured relative to a zero density, 100% diffuse reflector in the original scene, the instantaneous gamma values within scene exposure density range further lying entirely within a range of values subtended by an angle of 14° measured from a reference point at 0.0 scene exposure density and a viewed reproduction density gradient of A, wherein A is 1.0 in the case of direct view reflection media reproduction, 1.1 in the case of self-illuminated reproduction for viewing with ambient surround, and 1.3 in the case of a reproduction for viewing with dark surround.

121 Claims, 11 Drawing Sheets

COLOR IMAGE REPRODUCTION OF SCENES WITH PREFERENTIAL TONE MAPPING

CROSS-REFERENCE TO RELATED APPLICATION

This application is a continuation-in-part of U.S. Ser. No. 07/950,871 filed Sep. 24, 1992 now U.S. Pat. No. 5,300,381.

FIELD OF INVENTION

This invention relates, in general, to the broad field of image scene reproduction in color wherein the scene may be reproduced as a reflection print by means of a print process, such as a photographic, electrophotographic, inkjet or thermal dye transfer or the like process, or as a positive transparency or as a self illuminated image, such as in the case of a video image.

BACKGROUND

The relationship between the visually perceived densities of objects in an image scene reproduction compared to those in the original scene is a critical aspect of achieving viewer satisfaction with the reproduction. Visually perceived densities of objects in an original scene or in an image reproduction of the scene include effects of viewing flare and, as is known in the art, can typically be measured using a low-flare radiometer. The theoretically correct reproduction for this purpose is generally considered to be a one-to-one relationship between the densities of the original scene and the densities of the reproduction. This is described in the book "The Reproduction of Colour" by Dr. R. W. G. Hunt, (Fountain Press, England—Fourth Ed.), specifically in Chapter 6.

In reality however, actual tone reproduction produced by practical image reproduction systems deviates significantly from the theoretical one-to-one relationship that one might logically expect. For example, in conventional silver-halide based photographic systems, the silver-halide materials inherently tend to produce a well known non-linear, "S"-shaped relationship between the viewed print density (in the case of a print system) vs. scene exposure, such as shown on page 54 of the aforementioned Hunt reference. Similar curves are illustrated in FIGS. 1 and 2 in the accompanying drawings wherein FIG. 1 shows the D-logE curve D and its corresponding instantaneous gamma curve G representative of a typical amateur film/paper system and FIG. 2 shows the same class of curves D' and G' representative of a typical professional film/paper system. The term "instantaneous gamma" as used herein refers to the instantaneous rate of change of the image density, as perceived by the viewer, versus scene exposure density. Thus the curves G and G' correspond to the incremental slope values of the curves D and D', respectively.

It can be readily seen from FIGS. 1 and 2 that the instantaneous gamma curves of the reproduced image in both systems exhibit somewhat bell-shaped curvature in the mid-tone range with significant difference between the maximum and minimum values of the curves within the mid-tone range. The major result of this behavior in these reproduction systems is that the tone mapping of the reproduced image contains somewhat of an unnatural amplification of the mid-tone information in the image with a compression of the shadow and highlight information. The visual effect is one of a degree of harshness in the image that is recognized by the viewer as not being a natural reproduction of the original scene. It should be noted here that image reproduction of a scene that is perceived by a viewer to be a natural reproduction of the scene entails consideration of the effect that any stage in the reproduction process has on the entire process from image capture to final reproduction of the image. In U.S. Pat. No. 4,792,518—Kuwashima et al, there is disclosed a silver halide color reversal reflection print material, the purpose of which is to faithfully reproduce an original image which might exist in the form of either a transparency image or a reflection print image. This disclosure describes a method for faithfully, i.e. exactly, copying a transmission or reflection original and stresses the need for linearity in the gamma curve of the reproduction material across an extended range of original image density to achieve a faithful reproduction of the original image source (slide or print). To this extent, it is similar to the basic concept of a one-to-one relationship mentioned above in connection with the Hunt publication. Such a concept however, does not recognize or suggest what is needed to provide a natural color image reproduction of an original scene taking into account characteristics of the image capture medium and viewing flare when viewing the reproduced image. The print materials disclosed in this patent would simply reproduce whatever gamma characteristics exist in the image origination materials, which at present are distinctly non-linear, without regard to whether such materials would result in a natural reproduction of the original scene.

The challenge in image scene reproduction, therefore, is to reproduce the original scene in such a manner that upon viewing the reproduction, the viewer has the impression of looking at the original scene; that is to say, viewing the reproduction should inspire in the viewer the same response as if viewing the original scene. In this sense then, the reproduction will appear natural to the viewer even though it may not be exactly faithful to the original scene, i.e. may not be an exact measurable one-to-one density mapping relationship between the original scene and the reproduction. The result would then be a pleasing reproduction that would be preferred over reproductions that do not convey that impression.

It is desirable, therefore, to provide an image reproduction system and method that offers an overall tone mapping in the reproduced image as seen by the viewer that is perceived to be a natural and pleasing reproduction of the original scene.

SUMMARY OF THE INVENTION

A system and method of image reproduction in color with preferred or preferential tone mapping are provided in which the method includes the steps of capturing original scene parameters and creating a visual reproduction of the scene, the method additionally comprising:

performing a transformation of said captured scene parameters, said transformation being such that, taken in conjunction with untransformed characteristics of the capturing and creating steps, it results in a reproduced tone mapping having instantaneous gamma values of viewed reproduction density relative to density of the original scene which are greater than a minimum value of A and less than A plus 0.35 times scene exposure density over a scene exposure density range of from 0.60 to 1.45 as measured relative to a zero density, 100% diffuse reflector in the original scene, the instantaneous gamma values within scene exposure density range further lying entirely within a range of values subtended by an angle of 14° measured from a reference point at 0.0 scene exposure density and a viewed reproduction density gradient of A, wherein A is 1.0 in the case of direct view reflection media reproduction, 1.1 in the case of self-illuminated reproduction for viewing with ambient surround, and 1.3 in the case of a reproduction for viewing with dark surround.

In accordance with one aspect of the invention, a method of presenting a reproduction of an original scene with a preferential tone mapping comprises the steps of capturing original scene parameters and of creating a visual reproduction of the scene from the captured scene parameters wherein at least one of the capturing and creating steps includes a scene parameter transformation which, taken in conjunction with untransformed characteristics of the capturing and creating steps, results in a predetermined reproduced tone mapping in which instantaneous gamma values of viewed image reproduction density relative to density of the original scene is greater than A and less than A plus 0.35 times scene exposure density over a scene exposure density range of from 0.60 to 1.45 as measured relative to a zero density, 100% diffuse reflector in the original scene, the instantaneous gamma values within scene exposure density range further lying entirely within a range of values subtended by an angle of 14° measured from a reference point at 0.0 scene exposure density and a viewed reproduction density gradient of A, wherein A is 1.0 in the case of direct view reflection media reproduction, 1.1 in the case of self-illuminated reproduction for viewing with ambient surround, and 1.3 in the case of a reproduction for viewing with dark surround.

In accordance with another aspect of the invention, a system is provided for presenting a preferential tone mapping in a reproduction of an original scene, the system being of the type having means for capturing original scene parameters onto a medium from which a reproduction of the original scene is to be derived and means for creating a visual reproduction of the scene from the captured scene parameters. The system is characterized according to the invention by at least one of the capturing and creating means including scene parameter transformation means for imparting to the visual reproduction, when taken in conjunction with untransformed characteristics of the capturing and creating means, a reproduced tone mapping having instantaneous gamma values of viewed image reproduction density relative to density of the original scene is greater than A and less than A plus 0.35 times scene exposure density over a scene exposure density range of from 0.60 to 1.45 as measured relative to a zero density, 100% diffuse reflector in the original scene, the instantaneous gamma values within scene exposure density range further lying entirely within a range of values subtended by an angle of 14° measured from a reference point at 0.0 scene exposure density and a viewed reproduction density gradient of A, wherein A is 1.0 in the case of direct view reflection media reproduction, 1.1 in the case of self-illuminated reproduction for viewing with ambient surround, and 1.3 in the case of a reproduction for viewing with dark surround.

The invention provides an image reproduction system and method that offers an overall tone mapping in the reproduced image as seen by the viewer that is perceived to be a natural and pleasing reproduction of the original scene.

DETAILED DESCRIPTION

Figure 1:
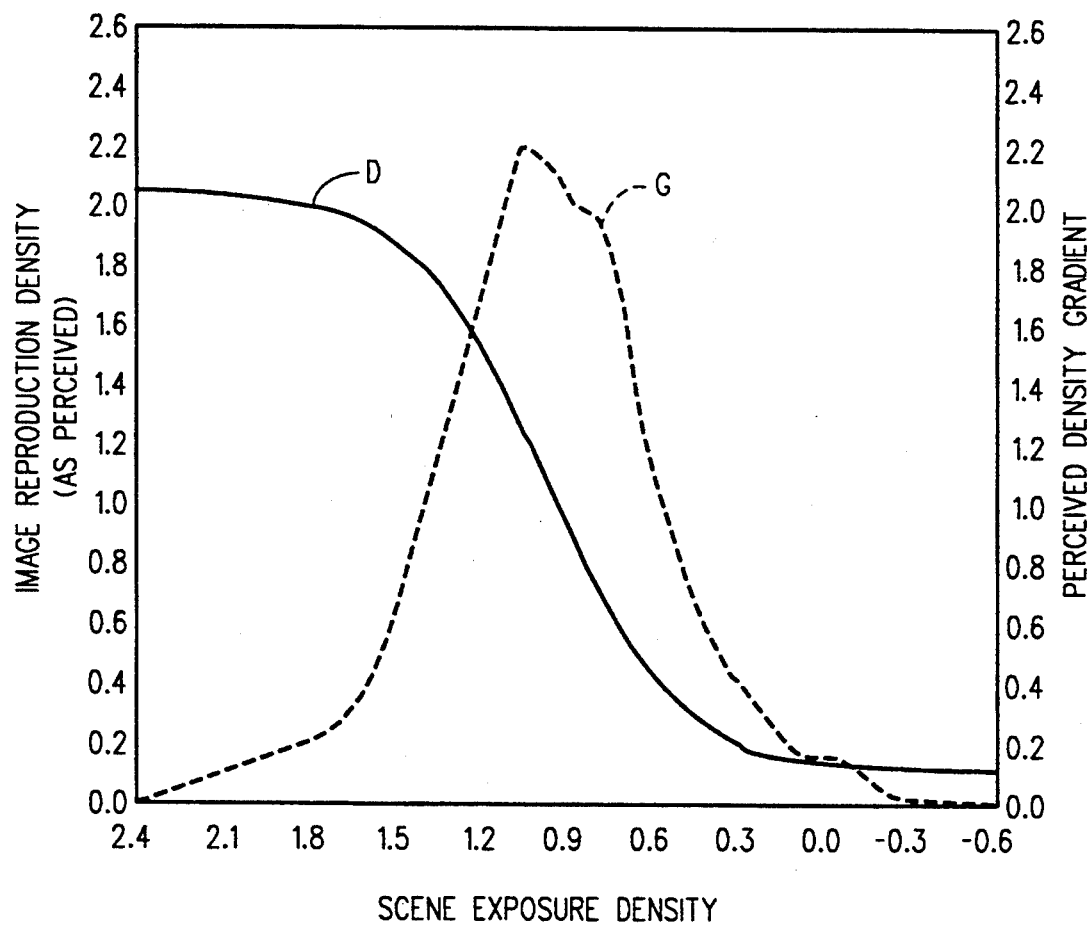
FIG. 1 is a graph illustrating image reproduction gamma and instantaneous gamma characteristics of a photographic system using conventional amateur negative film and print paper.
Figure 2:
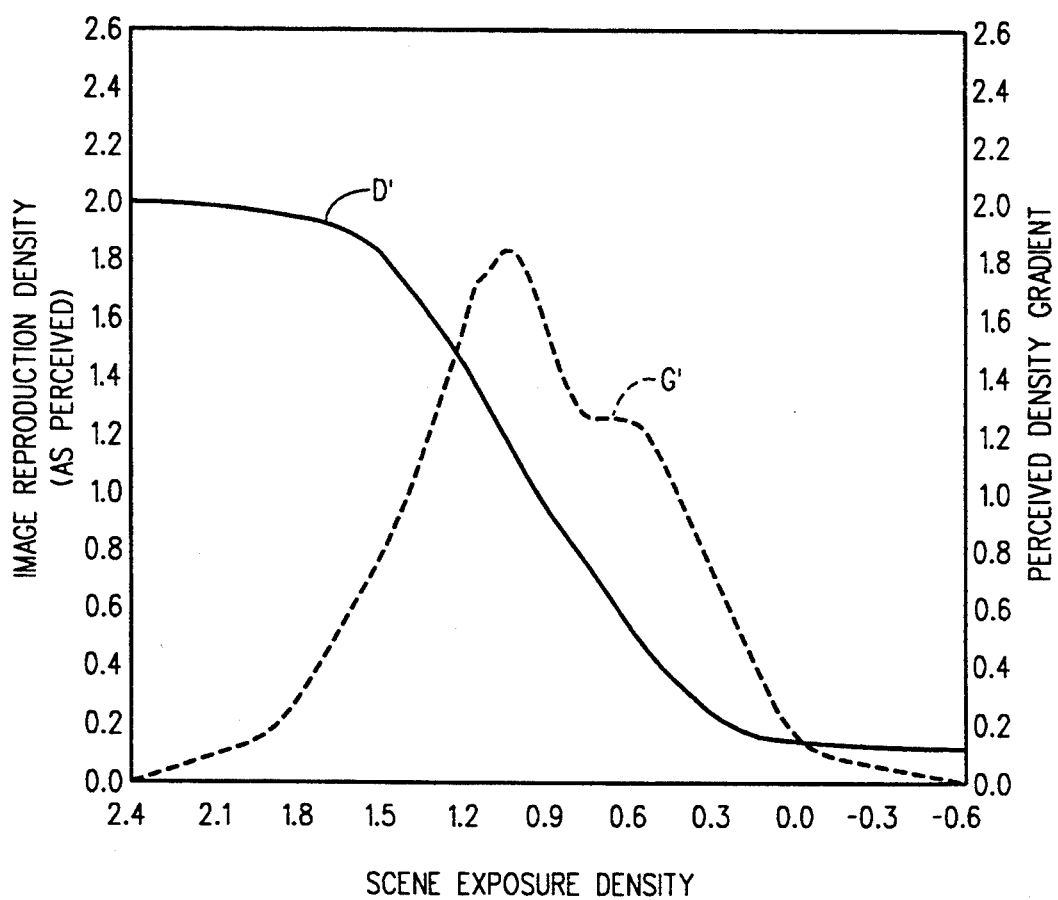
FIG. 2 is a graph similar to FIG. 1 but for conventional professional negative film and print paper.
Figure 3:
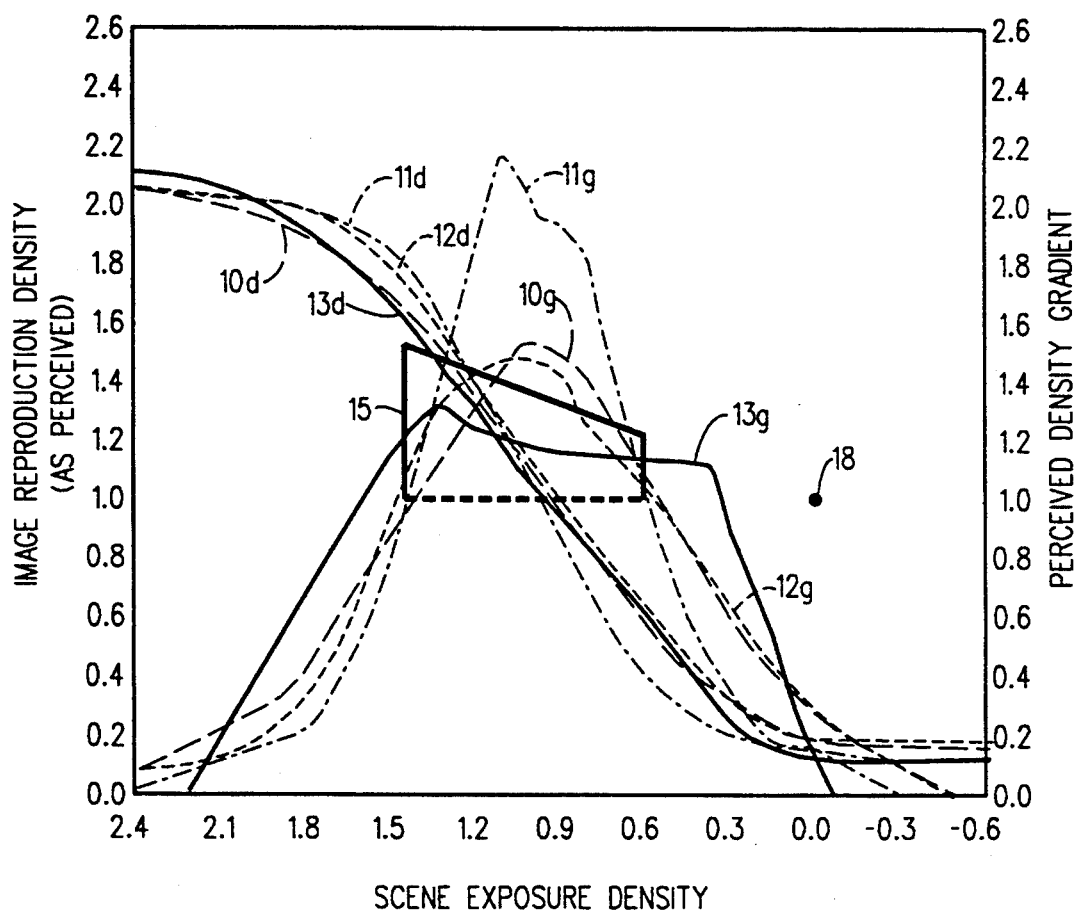
FIG. 3. is a graph similar to FIG. 1 illustrating a comparison of a variety of conventional image reproduction gamma and instantaneous gamma characteristics with the corresponding characteristics for a system and method of the present invention.
Figure 4:
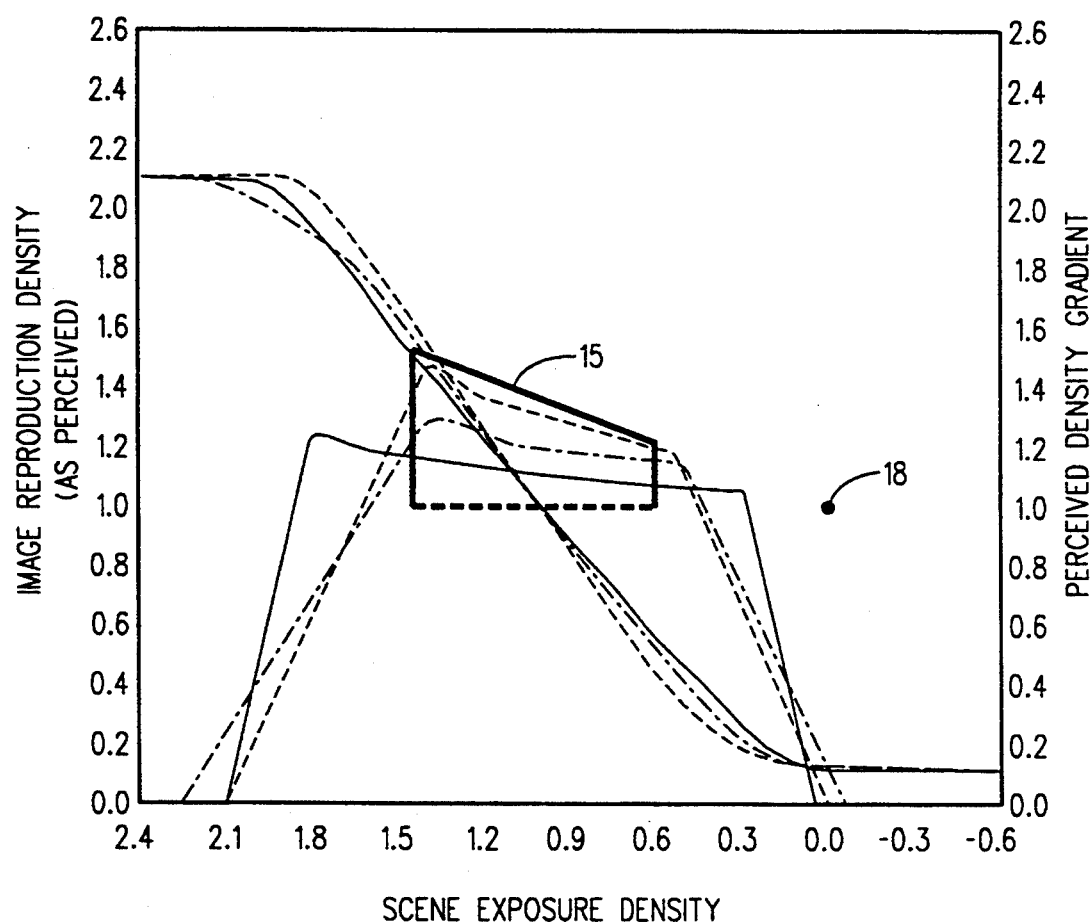
FIG. 4 is a graph illustrating scene image reproduction gamma and instantaneous gamma characteristics for a variety of image reproduction systems of the invention.

It has been found through an extensive series of empirical tests that a preferred tone mapping exists for reproduced images that provides the viewer with the perception that the reproduced image is a faithful reproduction of the original scene wherein this tone mapping matches neither the theoretical 1:1 relationship described by Hunt in the aforementioned publication nor the actual tone mapping relationship that is achieved with conventional image reproduction systems. Data developed in these tests have led to the conclusion that the best images are produced for most of a variety of scene types when the perceived densities of the reproduced image are related to the viewed densities of the original scene by an approximately linear function of instantaneous gamma over a large part of the scene density range. A comparison of representative conventional tone mappings with one example of a preferred tone mapping according to the invention is illustrated in FIG. 3 which shows a series of D-logE curves 10d–13d and corresponding instantaneous gamma curves 10g–13g for a variety of different film/paper hardcopy image reproduction systems. Curve pairs 10d,10g–12d,12g were generated from conventionally available negative film/print paper photographic systems while curve pair 13d,13g, which illustrates the preferred tone mapping, was generated using conventional negative film optoelectronically scanned to develop pixel signals which were then image-processed and printed on color print paper. The general techniques of optoelectronic image scanning, digital signal processing and digital color printing are well known and do not, of themselves require detailed discussion herein. However, the particular image transformation function employed in the digital image processing was adapted in accordance with a feature of the invention to introduce a transformation that resulted in the perceived tone mapping characteristic shown by curves 13d,13g in FIG. 3. It will be appreciated that each of the curve pairs 10d,10g through 13d,13g represent different system-dependent reproduction characteristics in which the resultant output tone mapping relative to scene input information is dependent on the functional characteristics of the materials employed in the scene reproduction process. It will also be noted that for the three systems represented by curve pairs 10d,10g through 12d,12g, the instantaneous gamma curves 10g–12g are substantially bell-shaped in the mid-tone rage with significant variation between the maximum and minimum values of the curves within the mid-tone range. The mid-tone range, for this purpose can be seen to extend from about 0.6 to about 1.45 relative to a zero density, 100% diffuse reflector in the original scene. This reference reflector is represented in the graph of FIG. 3 by point 18 at the intersection of zero exposure density and 1.0 image reproduction density gradient and is commonly referred to in the art as a reference of 100% white in the scene. By comparison with the conventional systems, however, the instantaneous gamma curve 13g for the system of the invention is more flat, without the bell-shaped characteristic, approaching that having a nearly horizontal, linear segment in this same mid-tone range of scene exposure densities of from about 0.6 to about 1.45 relative to 100% white in the scene. While a single system according to the invention, as represented by curves 13d,13g, is illustrated in FIG. 3, it bas been found through the aforesaid empirical tests that perceived natural image reproduction is achieved by systems that exhibit values of instantaneous gamma falling within a range of output densities, albeit fairly limited in extent, as is graphically indicated in FIG. 3 by trapezoidal outline or window 15. This graphically illustrated range of instantaneous gamma values can be described in quantitative terms as being a range of values of viewed reproduction density gradient relative to density of the original scene which are greater than 1.0 and less than 1.0 plus 0.35 times scene exposure density over a scene exposure density range of from about 0.60 to about 1.45 as measured relative to a zero density, 100% diffuse reflector in the original scene. In FIG. 4, a number of instantaneous gamma functions according to the invention are shown which fall within this described range and which have been found to give preferred perceived image reproduction for a wide variety of scene types.

Figure 6:
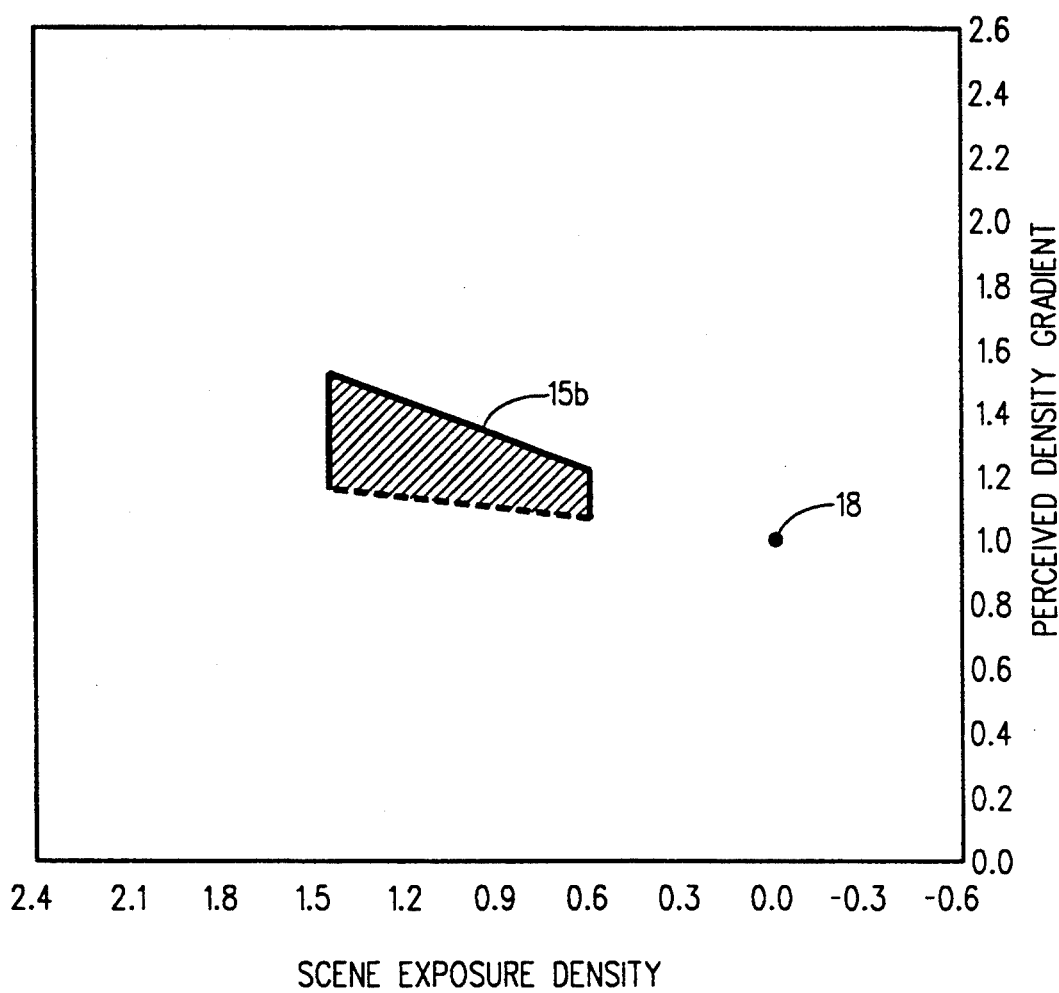
Figure 7:
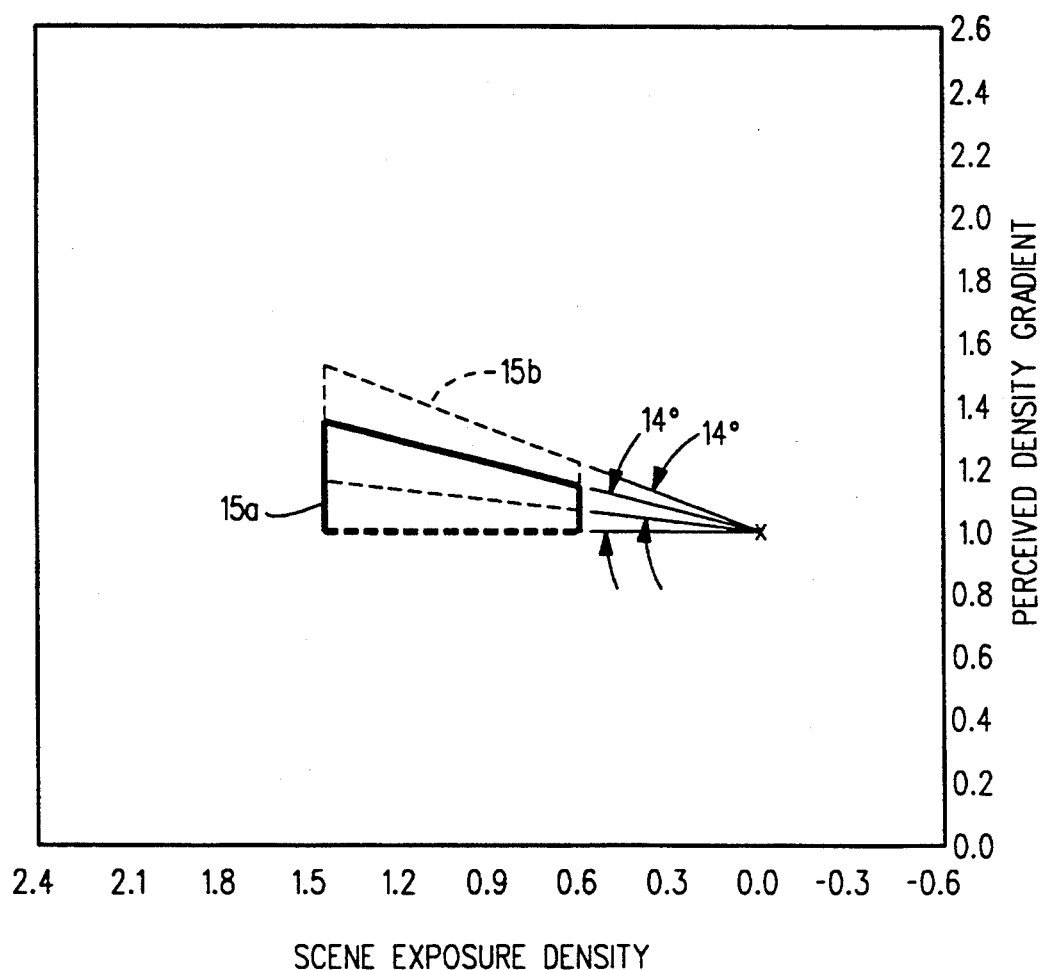

It has been found that, for most scenes, preferred image reproduction results in gamma functions that fall within the lower portion of the range 15. This range of preferred gamma function is illustrated by trapezoid 15a in FIG. 5 and may be described quantitatively as being viewed reproduction density gradient values greater than 1.0 and less than 1.0 plus 0.25 times scene exposure density in the range of scene exposure density of from 0.6 to 1.45 measured against the 100% white as described above. For some scenes, however, it has been discovered that a slightly modified range of instantaneous gamma values give preferred images. Scenes of the latter type are generally scenes which have limited contrast range such as low light scenes; a dusk scene or a foggy scene being typical examples. For scenes of this type, preferred instantaneous gammas would fall in the upper portion of the range 15 in FIG. 4 and as illustrated specifically in FIG. 6. While these latter instantaneous gammas are slightly higher overall than for the "most scene" range of instantaneous gammas shown in FIG. 5, the included range of values in each boundary set is approximately the same. Thus further in accordance with the invention, the range of acceptable gamma values within the aforementioned mid-tone range may be further defined as lying entirely within a range of output density values subtended by an angle of about 14° measured from the 100% white reference point 18. This is illustrated in FIG. 7 in which the solid line trapezoid 15a represents gamma range boundary conditions that provide preferred viewed image reproduction for "most scenes" case while the dotted line trapezoid 15b is applicable to low contrast scenes. In each case, as can be seen, the angle subtended by the trapezoidal area is indicated as being 14°. While 14° is indicated as the preferred boundary condition, it will be appreciated that some limited deviation from this precise figure is possible. Techniques and apparatus for film image classification in photofinishing processes are well known. Thus, it is within the scope of the invention to provide for image classification, for example in film scanner apparatus 24, to identify images which are best reproduced with the instantaneous gamma characteristic 15a and other scenes, notably low contrast scenes, which are best reproduced with the intantaneous gamma characteristic 15b. Other scene classifications can be envisioned that would preferably use an instantaneous gamma characteristic range as described above other than 15a or 15b but nonetheless falling within the overall boundaries of trapezoid 15. Knowing the image classification, the appropriate lookup table in image processor 26 would then be employed to achieve the desired resultant instantaneous gamma characteristic in the image reproduction.

In the foregoing and succeeding discussion regarding the Figures, it has been assumed that the reproduction to be viewed is one on reflective media for direct view and therefore A, as described in the Summary of the Invention, is 1.0. In the case of a reproduction that is self-illuminated for viewing with ambient surround or one that is for viewing with dark surround, the value for A would be 1.1 or 1.3, respectively.

Up to this point, the invention has been described with emphasis on the nature of the instantaneous gamma function of the viewed image reproduction. This is due in large part to the fact that the phenomenon of natural reproduction of an original scene involves a knowledge and understanding of the manner in which scene parameters are affected by each step in the process of scene capture and image reproduction. With this newly discovered knowledge of what constitutes preferred natural image reproduction, it then becomes possible to direct the adjustment of any one or more of the stages in the overall process to achieve the desired result of natural image reproduction which is best characterized in a quantitative manner by the instantaneous gamma function definitions set forth above. With this knowledge, many methods and corresponding systems can be formulated to achieve this result. Some examples of such systems will now be considered.

Figure 8:
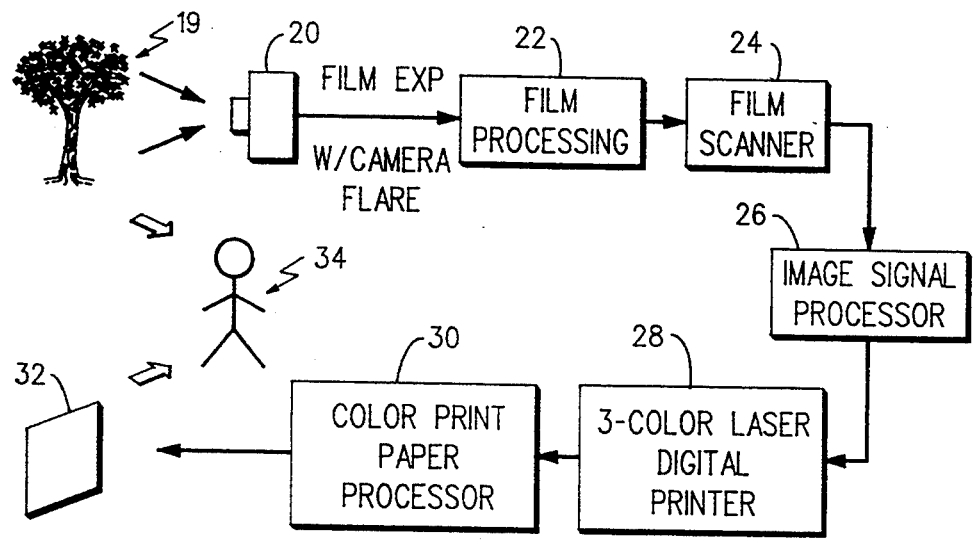
FIG. 8 is a schematic representation of a scene image reproduction system in accordance with the system and method of the present invention.
Figure 9:
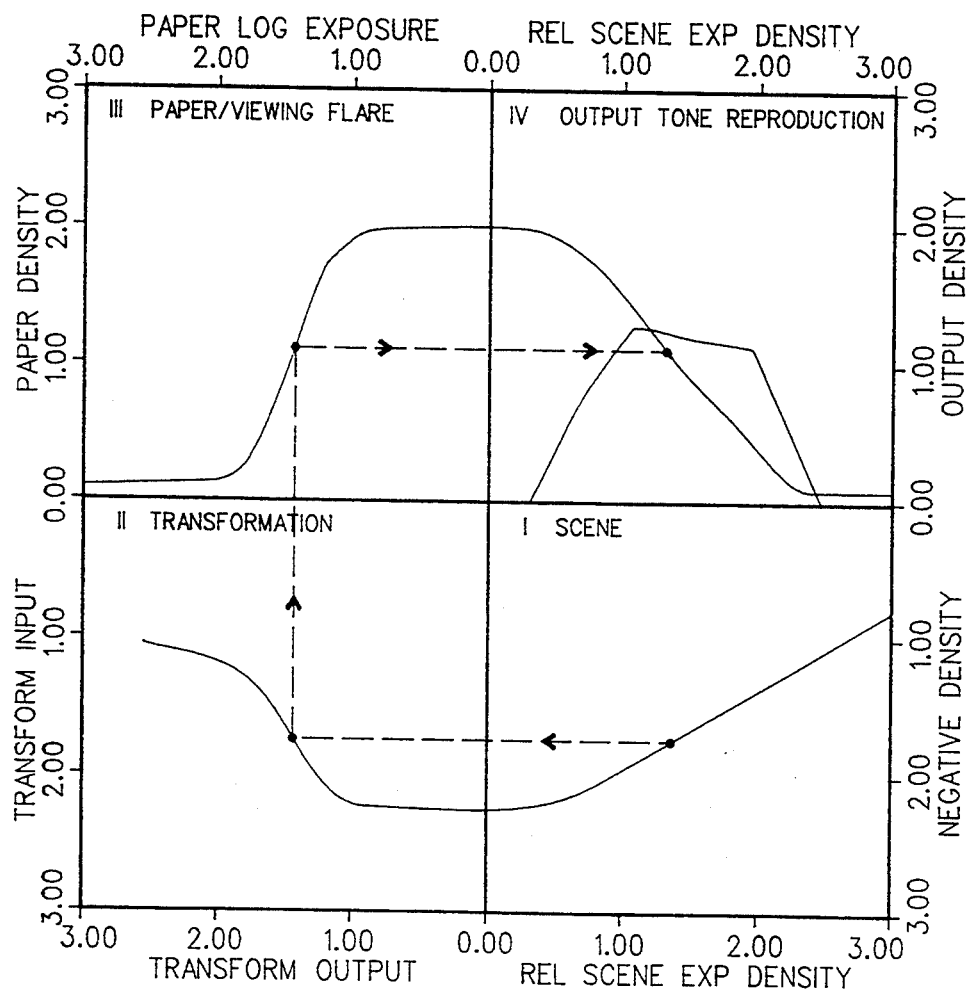
FIG. 9 is a four quadrant tone reproduction diagram for the system of FIG. 7.

Referring to FIG. 8, an example image reproduction system is shown which incorporates provision for producing the preferred tone reproduction images in accordance with the present invention. In this system, a conventional single lens reflex camera 20 may be used to capture a scene 18 on conventional ISO 100 color negative film (not shown). This film is then processed in known manner in a film processor 22 to produce a negative film image having a D-logE characteristic curve 40 illustrated in Quadrant I of the four quadrant tone reproduction diagram of FIG. 9. It will be appreciated by those skilled in the art that the film D-logE curve 40 includes the effects of the camera-exposing flare introduced by virtue of light scatter in the camera and taking lens. Typically, the film from the processing stage would then be directly printed at the photofinishing lab using a printer and a color print paper processor 30 to produce a hardcopy color print 32. The transfer function of such conventional print production might typically be represented as shown in Quadrant III of FIG. 9. Desirably, the print 32 should appear to a viewer 34 as a preferred natural reproduction of scene 18. However, assuming the scene capture medium, as represented by the camera and film characteristics of Quadrant I, and the image reproduction medium, as represented by the printer and paper characteristics of Quadrant III, are all conventional, the resultant D-logE and corresponding instantaneous gamma function will typically appear as shown by one of the conventional curve pairs 10d,10g–12d,12g of FIG. 3. In other words, the instantaneous gamma function for the image reproduction would have substantial portions lying outside the preferred trapezoidal tone mapping range within the boundaries of trapezoid 15. However, even with the photographic system such as just described involving conventional film and paper processing, it is possible to shape the resultant D-LogE and corresponding gamma function curves of Quadrant IV by providing a predetermined digital or analog transformation function, as represented in Quadrant II, which, taken in conjunction with the conventional transfer functions of Quadrants I and III, will achieve the desired output function of Quadrant IV. Thus, to this end in the embodiment of FIG. 8, the developed film is applied to a film scanner 24 in which the image is converted to a series of image pixel signals, the amplitude value of each pixel signal being related to the density of the corresponding pixels in the film image. The image pixel signals are then applied to an image signal processor 26 wherein the image pixel signals are modified in accordance with the predetermined transformation characteristic of Quadrant II and fed to an appropriate printing device such as a three color laser printer used to expose the photographic paper prior to being processed in processor 30. Preferably, the scanned pixel signals are converted to digital form in known manner, either in the scanner 24 or the signal processor 26, to simplify the signal modifying processing function in the processor 26. Since the transfer characteristics of the scene capture and image reproduction media are easily measured and generally well known, it is a fairly straightforward matter utilizing known techniques in the art of digital image processing to establish the intermediate transfer function of Quadrant II in the form of a lookup table in the digital processor 26 to achieve the desired results. The advantage of using digital image processing as just described is the ability to achieve the preferential tone mapping of the invention using image capture and image reproduction media which do not inherently have the desired transformation functions. Alternatively, it possible to embody the desired transformation function within the material of either the image capture stage, e.g. the photographic film or within the image reproduction stage, e.g. the photographic print paper, in the case of photographic reproduction systems. It is also possible to share the transformation function within both the image capture and image reproduction stage as might be the case, for example, where matched film and paper media are employed.

Figure 10:
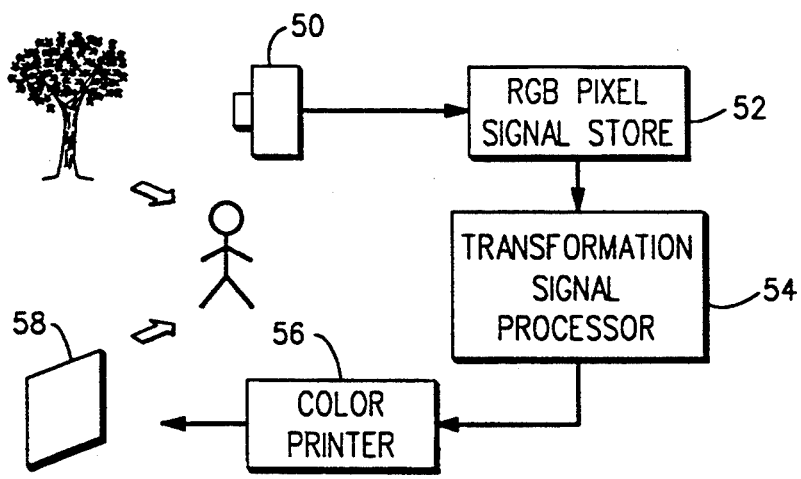
FIG. 10 is a schematic representation of an alternative scene image reproduction system in accordance with present invention.
Figure 11:
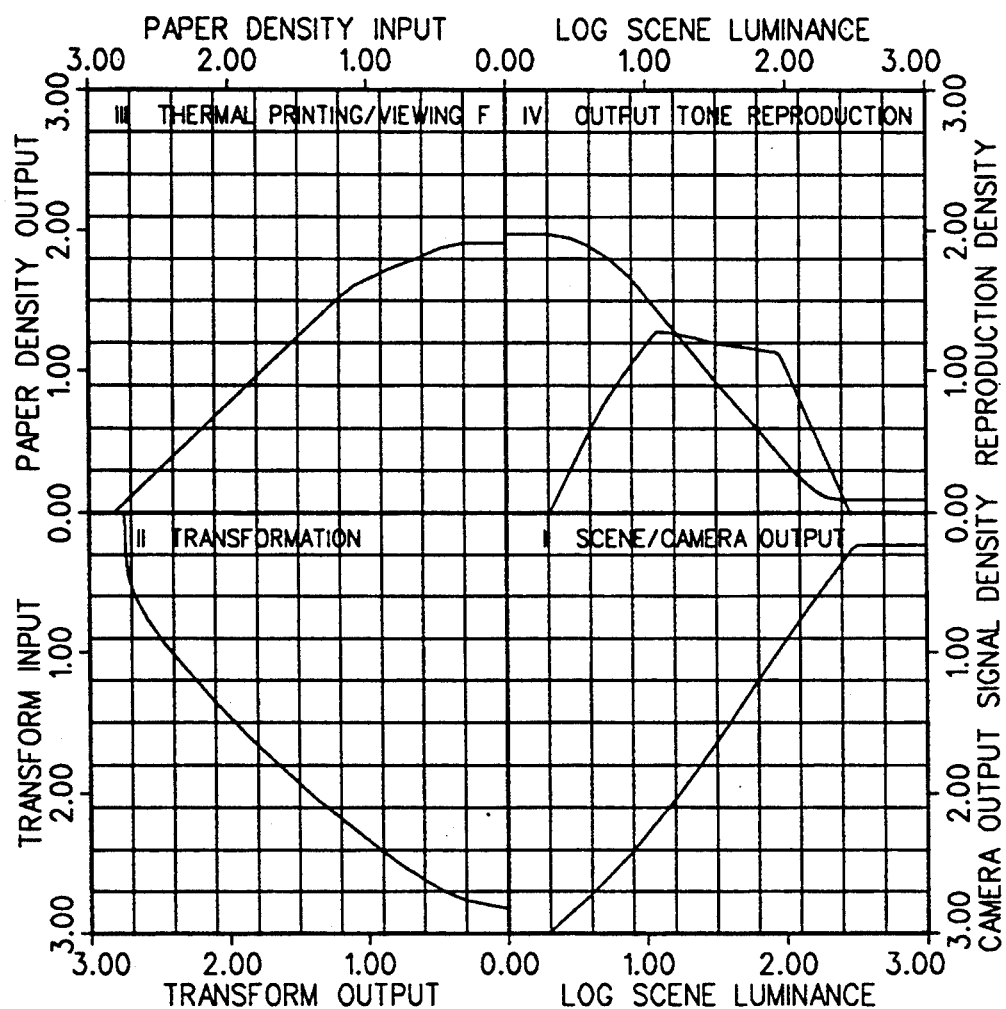
FIG. 11 is a four quadrant tone reproduction diagram for the system of FIG. 9.

FIG. 10 illustrates an alternative system involving a purely electronic image capture system including an electronic camera 50 and an RGB image signal store 52. In a system of this type, the image is typically captured directly in the form of image pixel signals which may then be manipulated in an image signal transformation processor 54, in accordance with the invention, using an appropriate lookup table to modify the image signals according to the transfer function of Quadrant II in FIG. 11. The modified signals are then applied to a conventional color printer 56 where the image is printed directly in hardcopy form in known manner using thermal dye transfer, inkjet processes or laser printing or the like. The transfer function of Quadrant I corresponds to the conventional transfer function of the scene capture stage, including camera 50, and the transfer function of Quadrant III corresponds to the conventional transfer function of the image reproduction stage, including printer 56. It will be appreciated, however, that the image processor transfer function modification of Quadrant II can also be incorporated into either the scene capture stage or the image reproduction stage thus modifying the corresponding transfer function of Quadrant I or Quadrant III, respectively, such as was described in respect to the photographic system of FIG. 8.

Figure 12:
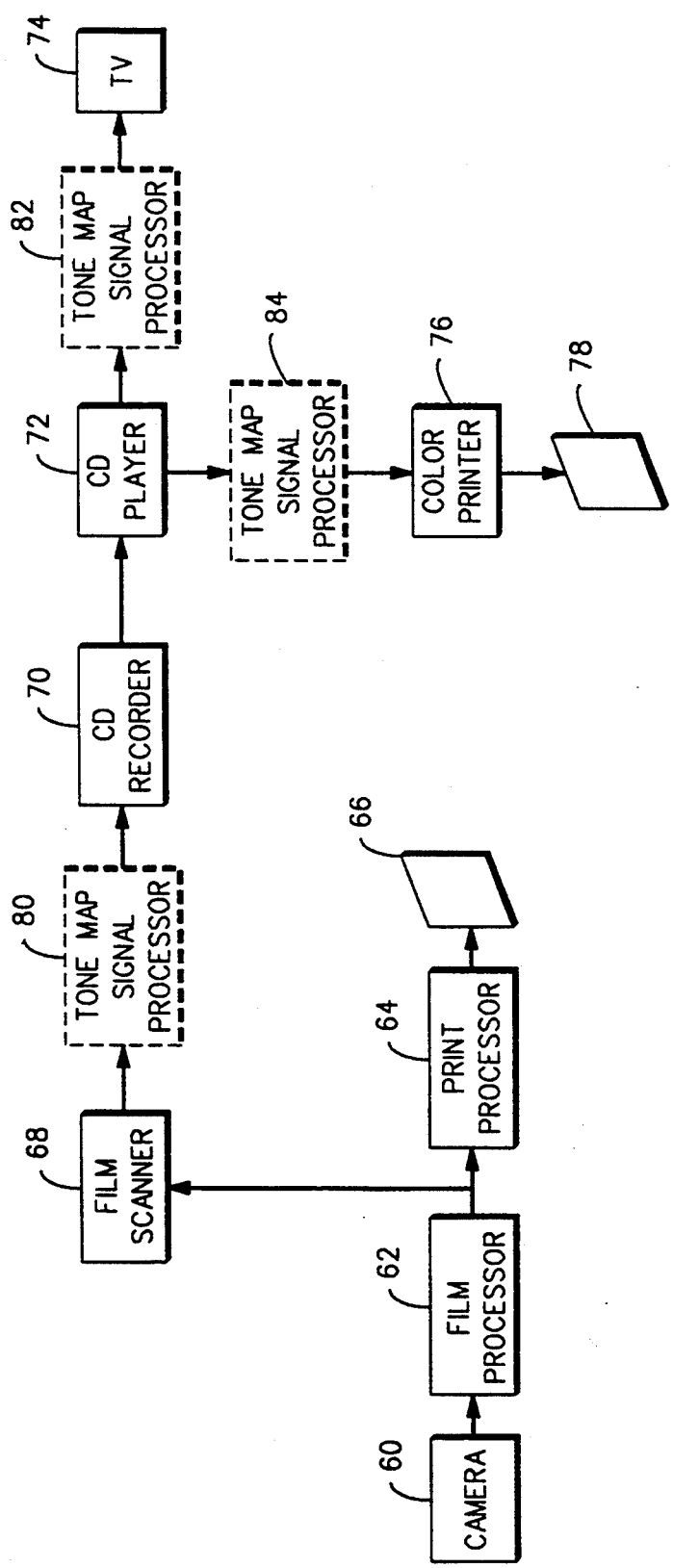
FIG. 12 is a schematic representation of an scene image reproduction system incorporating digital image storage on a compact disc and illustrating alternative configurations in which the present invention might be practiced.

Referring now to FIG. 12, there is shown an image reproduction system of the hybrid type involving capability for both photographic and electronic image reproduction. A system of this type, as represented by the solid line functional blocks, has been introduced by the Eastman Kodak Company under the name of Photo-CD and is capable of providing reproduced images in a variety of formats such as by means of photographic prints and video images on the screen of a television cathode ray tube. As illustrated in FIG. 12, a photographic camera 60 is used to expose film which is submitted to a photographic lab where it is developed in a film processor 62 and applied to a print processor 64 for the production of photographic prints 66. In accordance with the principals of the aforementioned Photo-CD process, the film negatives may also be applied to a film scanner 68 for generation of image pixel signals which are converted to digital form for recording on an intermediate signal recording medium such as an optical recording compact disc (not shown) by means of a CD recorder 70. The film negatives, prints and compact disc are then furnished to the customer. Assuming the customer has an appropriate CD player 72 connected to a television set 74, the images recorded on the disc can be played back through the TV set for viewing, and manipulating in a number of ways, such as zooming, cropping etc.. Alternatively, the image signals output from the CD player 72 may be applied to a hardcopy printer 76, which may, for example, comprise a thermal dye transfer color printer, for the production of color prints 78 in the home with or without manipulation of the prints, i.e. zooming, cropping etc.

In accordance with the invention, the tone mapping in the output reproduced image may be accomplished by modifying the image pixel signals as described above using a signal processor 80 at the output of the film scanner 68 in the photographic lab prior to recording of the signals on the compact disc or by means of a signal processor 82 or 84 at the output of the disc player 72. In practice, the processors 82 and 84 might be the same with provision for selection of the appropriate lookup table for the desired transfer function depending on whether tone mapping adapted for the thermal printer or for the video image produced in the TV set 74 is to be employed. Adaption for images reproduced on a self-illuminated image reproduction device such as a TV cathode ray tube would be required due to the well known effect that the surround has on a viewer's perception of the image being viewed. This would be accommodated in the video image by shifting the boundary conditions and the 100% scene white reference point of FIGS. 5-7 by +0.1 density gradient units to thereby produce equivalent parameters for the TV image. In a similar vein, it will be appreciated that projected images, slide projections or video image projections, are generally viewed in relatively darkened surround conditions and equivalent parameters for projected images would be arrived at by shifting the boundary conditions and 100% white scene reference point of FIGS. 5-7 by +0.3 density gradient units.

As described in the invention summary, the tonal mapping from original scene to preferred reproduction is comprised of these conceptual steps: (1) original scene parameter capture, (2) effecting desired transformation between the original scene parameters and the visual reproduction parameters, and (3) creation of the visual reproduction. The transformation may be effected through one or more steps intermediate capture and reproduction or may be integrated with one or both of the capture and reproduction steps. The result of this process is a predetermined reproduced tone mapping in which instantaneous gamma values of viewed image reproduction density relative to density of the original scene is greater than A and less than A plus 0.35 times scene exposure density over a scene exposure density range of from 0.60 to 1.45 as measured relative to a zero density, 100% diffuse reflector in the original scene, the instantaneous gamma values within scene exposure density range further lying entirely within a range of values subtended by an angle of 14° measured from a reference point at 0.0 scene exposure density and A viewed reproduction density gradient, wherein A is 1.0 in the case of direct view reflection media reproduction, 1.1 in the case of self-illuminated reproduction for viewing with ambient surround, and 1.3 in the case of a reproduction for viewing with dark surround.

Image manipulation consists of the altering of the tones in the captured scene in a way which will produce the desired tones in the final viewed image. Reproduction generation defines the creation of the final reproduction of the original scene which will be viewed. The process of capturing an image and generating a reproduction with the prescribed tonal mapping may be accomplished by a single complex element, as in instant photography, or in two or more separate steps. Regardless of the number of steps, conceptually the scene is first captured by a light sensitive element, transformed, and converted into a viewed material. For the "instant" process, the transformation between the tones in the original scene and their prescribed analogs in the reproduction is incorporated in the light sensitive element/display material. The tone mapping characteristics of each step in the process must be known so that all manipulations achieve the prescribed mapping between the original scene tones and those in the viewed reproduction.

In the following discussion, "scene" refers to the original scene parameters; "camera" refers to a device capable of controlling the optical exposure of a light sensitive element to capture a scene; "sensor" refers to a light-sensitive element capable of capturing the tones in a scene in a quantifiable manner; "preferred tone mapping" refers to tone mapping in which instantaneous gamma values of viewed image reproduction density relative to density of the original scene is greater than A and less than A plus 0.35 times scene exposure density over a scene exposure density range of from 0.60 to 1.45 as measured relative to a zero density, 100% diffuse reflector in the original scene, the instantaneous gamma values within scene exposure density range further lying entirely within a range of values subtended by an angle of 14° measured from a reference point at 0.0 scene exposure density and a viewed reproduction density gradient of A, wherein A is 1.0 in the case of direct view reflection media reproduction, 1.1 in the case of self-illuminated ambient surround reproduction, and 1.3 in the case of a dark surround reproduction; "storage" refers to the storage of scene parameters in any way which allows retrieval without loss of fidelity and includes, for example, electronic, optical, magnetic, magneto-optical, biological, chemical, and other mechanisms which provide reliable scene parameter storage.

The present invention may be employed in combination with features described in published materials relating to photographic processes including the following, the pertinent portions thereof being incorporated herein by reference:

1. R. W. G. Hunt, *The Reproduction of Color in Photography, Printing, and Television*, 4th Ed., 1987, Fountain Press, England.
2. Larish, John J., *Understanding Electronic Photography*, ISBN 0-8306-8315-4
3. E. Giorgianni, U.S. Pat. No. 5,267,030
4. Larish, Ibid, Chap. 4.
5. Holt, A., Electronic Circuits, ISBN 0-471-02313-2.
6. *Digital Image Processing*, R. Gonzalez and P. Wintz, Addison-Wesley Publ. Co., 1977.
7. *Digital Image Processing*, W. K. Pratt, J. Wiley & Sons, 1991.
8. *Fundamentals of Digital Image Processing*, A. K. Jain, Prentice Hall, 1986.
9. *Linear Systems, Fourier Transforms, and Optics*, J. D. Gaskill, J. Wiley & Sons, 1978.
10. *The Theory of the Photographic Process*, T. H. James, Editor, 4th Edition, 1977, Macmillan Publishing Co., Inc.
11. "Device-Independent Color Imaging and Imaging Systems Integration", Proceedings of the SPIE, Vol. 1909, Feb., 1993.
12. "Color gamut mapping techniques for color hardcopy images", T. Hoshino and R. S. Berns, Proceedings of the SPIE, Vol. 1909, p 152, Feb., 1993.

13. Castellano, *Handbook of Display Technologies*, Academic Press, 1992—ISBN-0-12-163470-5.
16. J. Millman, J., Microelectronics, ISBN 0-07-042327-X
17. KLI2103 Performance Specification, Eastman Kodak Co.
18. (PIW) Hubbard, G., "Photo CD Systems: A Technical Overview", *Proceedings of IS&T 44th Annual Conference*, Advanced Printing of the Paper Summaries for the Proceedings of IS&T 44th Annual Conference, ISBN 0-89208-156-2, IS&T, May 12–17, 1991.
19. (Johnson, PCD storage format) Melnychuk and Barry, "Photo CD Systems: A Technical Overview", *Proceedings of IS&T 44th Annual Conference*, Advanced Printing of the Paper Summaries for the Proceedings of IS&T 44th Annual Conference, ISBN 0-89208-156-2, IS&T, May 12–17, 1991.
20. S. Thurm, K. Bunge, and G. Findeis, "Method of and Apparatus for Determining the Copying Light amounts for Copying from Color Originals, U.S. Pat. No. 54,279,502, Jul. 21, 1981.
21. Wheeler, Wilson, and O'Such, U.S. Pat. No. 5,049,916, Automatic "Optimization of Photographic Exposure Parameters through Determination and Utilization of Extra System Speed".1
22. Baumeister, U.S. Pat. No. 4,739,409, "Intelligent Exposure Control for Electronic Cameras".
23. C. J. Bartleson and R. W. Huboi, "Exposure determination methods for color printing: The concept of Optimum correction level", J. SMPTE, Vol. 65, p 205–215, 1956.
24. "Advanced Color Printing Technology for Photofinishers and Professional Finishers", Eastman Kodak CO., 1979.
25. R. M. Evans, "Method for Correcting Photographic Color Prints", U.S. Pat. No. 2,571,697, Oct. 16, 1951.
26. H.-C. Lee, U.S. Pat. No. 4,663,663, 1987, "Digital Color Image Processing Method Employing Constrained Correction of Color Reproduction Function".
28. Tannas, Flat Panel Display and CRT's, ISBN 0-442-28050-8
29. Retrieval of sensor recorded information by nonstandard techniques such as electrical scanning of silver halide latent image, L. Kellogg, U.S. Pat. No. 4,788,131.
30. Research Disclosure, November 1992, Item 34390 published by Kenneth Mason Publications, Ltd., Dudley Annex, 12a North Street, Emsworth, Hampshire P010 7DQ, ENGLAND.
31. Research Disclosure, December 1989, Item 308119 published by Kenneth Mason Publications, Ltd., Dudley Annex, 12a North Street, Emsworth, Hampshire P010 7DQ, ENGLAND.

Step (1)—Original Scene Parameter Capture

Capturing the original scene parameters can be accomplished by any light-sensitive element, or sensor, capable of sensing the tonal values of the objects in a scene in a manner which quantitatively determines their relative log luminances. The sensor is typically contained in a device or camera which controls its exposure to light. Examples of cameras and sensors include but are not limited to cameras using photographic films and electronic cameras using CCD (Charge-Coupled Device) sensors. Cameras and sensors may be of any suitable physical dimensions.

The sensors in conventional photographic applications are silver halide based photographic materials that may be negative or positive working film, semi-reflective film, or reflection paper although the most common embodiment is color negative film. Conventional films and papers contain a multilayer structure with separate color record imaging materials. Films specifically designed for scanning are also appropriate. The film may or may not be contained in spools, cartridges, or similar containers, depending on the type of camera in which it is used. The film may contain non-optically sensitive materials, such as magnetic or electrical elements. Scene capture may be accomplished using all currently available silver halide photo-sensitive films and papers as well as those that will appear in the future. In the case of radiation sensitized goods which capture via latent image, the capturing step encompasses the formation of the latent image and the image obtained upon development of the latent image.

All cameras designed for the use of silver halide photo-sensitive materials are suitable for capturing original scene parameters. Preferred cameras are those which deliver as uniform an illumination field as possible on the photo-sensitive element, producing a uniform capture of the scene. The camera may record two-dimensional or three-dimensional images which may be still or moving. A typical camera is of the 35 mm single lens reflex type.

In silver halide photography, the scene is captured and stored as latent image in the silver halide emulsion grains. Subsequent to or concerted with photosensitive element exposure, the recorded information is often converted to a more permanent representation of the original scene parameters by some process, typically chemical although it can be also be thermal, magnetic, optical, or electrical in nature. The resultant recorded image is typically a transparent film, although it may be a reflection material or any other storage medium. A typical embodiment for conventional silver halide photography is the use of a 35 mm single lens reflex camera exposing color negative film followed by Kodak TM Flexicolor TM C-41 chemical development to produce an optical density varying representation of the original scene.

It is possible to convert scene parameters captured by the exposed element directly to an analog or digital electronic representation by scanning the exposed photosensitive element with a scanner incorporating an electrical, chemical, or thermal process capable of reading out the latent image distribution recorded in the film or paper. This mechanism for scene parameter capture is also suitable for use to create the preferred reproduction as shown in Ref. 5.

The scene may also be captured with an electronic camera containing one or more photosensitive elements which may be solid state sensors, photomultiplier tubes, storage phosphors, or other materials performing the same function. Electronic cameras capture original scene parameters using a regular array of picture elements (pixels) in one or more sensors. Electronic photography useful in the invention is described in detail in Ref. 2. Solid state sensors include CCD's, typically photocapacitors (full frame sensor) or photodiodes (interline sensors). Interline CCD's can perform electronic shuttering.

Electronic cameras consist of a lens element and shutter which focus the scene onto the sensor and control the exposure level and duration of the sensor. The camera may capture two-dimensional or three-dimensional images in an analog or digital mode which may be still or moving. A camera of this type will sense the tones in the original scene and convert them into an appropriate form for signal storage. The signal may be stored magnetically, optically, electronically, chemically, or biologically in the camera itself or associated equipment. A suitable embodiment for electronic capture is a Kodak DCS electronic camera which captures a scene with a solid state full frame photocapacitor CCD sensor and buffers the image in electronic RAM and stores the image on a magnetic hard disk located in the camera. The image data in RAM may be transmitted and then stored on media, such as magnetic tape, optical disk, magnetic disk, magneto-optical disks, etc.

Storage of scene parameters may be accomplished in a variety of ways. Electronic input may consist of image data representation stored using magnetic, optical, magneto-optical, RAM, biological, solid state, or other materials which permanently or semi-permanently record information in a retrievable manner. The mode input storage may be analog or digital. Magnetic storage is exemplified by floppy disks, hard drives, video tape, etc. on which are stored the representation of the original scene parameters stored as oriented magnetic domains which are written and retrieved by using magnetic heads. One suitable embodiment of magnetic storage is the PLI Infinity 88 RW/44 removable hard drive. Examples of optical storage include optical disks, laser disks, etc. on which the representation of the original scene parameters are stored in binary form as ablated pits, which when read reflectively result in variations in optical density at some wavelength on the optical media. The scene representation is recorded and retrieved by optical radiation means such as lasers. A suitable embodiment of optical storage is the PhotoCD disk. Magneto-optical storage devices use different technologies for storage, including both optical and magnetic mechanisms, for both reading and writing. A suitable example of magnetic recording is a rerecordable media is the PLI company model Infinity 21 MB Floptical Drive that uses magnetic writing and reading along with an optical servo for precise alignment. A suitable example of optical reading and writing in a magneto-optical device is the DataPak MO/650 optical drive that uses an applied magnetic field during the optical writing process. Examples of solid state storage include EPROMs (Electrically Programable Read-Only Memory), EEPROMs (Eraseable EPROM), and PROMs (Programmable Read-Only Memory), Ferroelectric nonvolatile RAMs (Random Access Memory), magnetic bubble memory, California Institute of Technology's biological chip NMOS (n-channel metal-oxide semiconductor) memory "ASSOCMEM", etc. This type of storage uses solid state devices to store image pixel information by electrical or magnetic means. The recording and reading of the stored information is effected by electrical signals. A suitable embodiment of solid state storage is a PCMCIA (Personal Computer Memory Card International Association) flash EEPROM and other storage techniques described in Ref. 2, Chapter 4.

Storage of scene parameters in analog or digital form requires using a storage format. This format specifies how the image is stored and it is device dependent. For example, an image may be stored in accordance with the JPEG (Joint Photographic Equipment Group) compression standard in flash EEPROM or in a PhotoCD format in a Kodak PhotoCD TM disk (optical storage.) This format must be known by the writing and reading operations to accurately retrieve the stored scene parameters. A suitable embodiment for digital image formatting is the optical PhotoCD TM of Eastman Kodak Co. (Ref. 9)

Instead of direct capture of the original scene parameters, it is also possible to access a representation of the original scene parameters, captured and stored at some prior time. These representations may be two-dimensional or three-dimensional and may be of still or moving scenes. The only requirement for this means of generating a preferred viewed reproduction of the original scene is that the relationship between the original scene parameters and those in the accessed original scene representation be known or that it be possible to make an accurate assumption about this relationship. The accessed scene representation was at some point captured using the methods described above for direct original scene parameter capture. A suitable embodiment for producing original scene representations is the PhotoCD system taught by Giorgianni (Ref. 3).

In addition to the typical pictorial original scene capture, the original scene may be an original creation (computer generated or otherwise) to be accessed through information storage or it may be a computer simulation of an actual scene. It may also be comprised in whole or part of text material or graphic designs or patterns. Any of the types of stored scene parameters as described above are acceptable as input as long as the relationship between the original scene and stored scene representations are known.

Computer simulations are also acceptable input representations of original scene parameters as long as the relationship between the original scene parameters and those in the accessed original scene representation are known or that it is possible to make an accurate assumption about this relationship. Computer simulations are based on an original scene capture as defined above. The computer simulation may manipulate any aspect of the original scene parameter, such as color, sharpness, contrast, etc. as long as the visual mapping modifications to the original scene parameters are quantified. The computer simulation scene representation is usually stored in computer RAM but may be stored on any of the storage media defined above. Examples of computer simulations include scene manipulation by Adobe Photoshop, Kodak Premier scene manipulation, or other similar readily available software which manipulates the scene parameters in a quantifiable manner.

Converting Optical Representations of Original Scene Parameters to Electronic Representations Electronic representations of original scene parameters can be created by converting non-electronic representations. For example, exposed and processed color negative film can be optically read using a microdensitometer to produce a digitized image. Any optical representation can be transformed in some manner to produce an acceptable intermediate representation of the original scene parameters as long as the transformation step is conducted in a quantifiable manner. Appropriate photographic media include transparent films, semi-reflective films, and reflective papers, both positive and negative working. These optical representations may be two-dimensional or three-dimensional and either still or moving scenes.

Optical scanning is an example of the conversion operation. Scanning can be accomplished by using a microdensitometer, linear CCD array, or similar device. The scanning of two-dimensional and three-dimensional optical representations can be done in transmission or reflection mode with a device which scans by point, line, or area. A microdensitometer generally uses a small illuminated spot to measure with 3 colored filters the point-by-point (pixel-by-pixel) transmission of a film sample or the reflection of a paper sample. The scanning process generally follows a regular pattern to completely measure the optical representation of the scene. The electronic signal measured by the microdensitometer or CCD scanner is usually an analog signal. If desirable, the initial analog signal may by digitized as an integral operation of the scanning device or may be effected as a subsequent step to the scanning operation. One suitable embodiment for film scanning is to measure exposed and processed color negative films with a Perkin-Elmer microdensitometer.

It is most convenient to use a CCD scanner to perform the transformation from optical representation to electronic representation because it can be done rapidly. A CCD scanner can scan a line of pixels at the same time or the entire image area with a 2-dimensional CCD sensor. CCD scanning techniques are described in Ref. 17 and Ref. 2. A suitable embodiment for CCD scanning is the Kodak KLI-2103 linear image sensor implemented in the Kodak PhotoCD Imaging Workstation (Ref. 18).

The scanned scene representation may be stored using any of the storage media described above. The representation may be stored as analog or digitized signals.

Analog/Digital Conversions

Signal processing may involve analog or digital signals. Analog signals may be sampled to produce a digitized or digital signals by using an analog-to-digital conversion techniques such as sigma-delta modulation, parallel comparator, integrating converters, and successive approximation, dual slope, or binary counting with error feedback. An analog signal is transformed into a digital representation by assigning all values of the analog signal between two values to a single digital value. The almost infinite values available in the analog signal are mapped to a finite number of values in the digital signal. The reduction in the number of possible scene parameter values is frequently beneficial for digital image processing. However, the analog signal must be digitized without losing valuable scene information. Thus the digital quantization must be conducted with enough resolution to maintain the image quality. It is typical to employ 256 gray levels or more to achieve good image detail but a far lesser number can be employed.

Converting digital signals to analog signals is simpler using hardware and can be accomplished by error feedback or comparator techniques or by summing binary-weighted currents, by means of resistor ladders, etc. This kind of conversion involves selectively applying the analog voltage which is to be digitized to a set of resistors whose resistances are each twice as large as the one before it and comparing the output voltage to the input which attempts to recreate the best analog signal from the digital signal. An example of such a conversion is the generation of images using LCD (Liquid Crystal Display) technology. Ref. 16 discloses other digital-/analog transformation methods useful in the invention.

Digital signals can also be converted to other digital signals. For example, an image representation consisting of 1024 gray levels may be sampled down to an image consisting of 256 gray levels. This kind of conversion can be useful in reducing image processing time.

It is also possible to convert one analog signal into another analog signal. An example is the conversion of analog RGB signals to analog NTSC (U.S. television standard) signals for display on a CRT (Cathode Ray Tube).

Step (2)—Effecting Desired Transformation Between Original Scene Parameters and the Visual Reproduction Parameters

Signal Processing

Signal processing is a key step in the transformation from the original scene parameters to the preferred visual reproduction parameters. Different kinds of signal processing are appropriate for the various processes which result in the obtaining the preferred viewed reproduction of the original scene. A suitable embodiment for creating digital reproductions from color negative film scene parameter capture is the use of the Kodak PhotoCD system, which involves (1) scanning the exposed and processed color negative film, (2) transforming the digitized signal into standard PhotoCD format using a Kodak PIW, (3) manipulating the PhotoCD image with digital signal processing so that a Kodak XL7700 printer creates a viewed reproduction of the original scene which has the desired scene mapping (FIG. 12). But this is just one method for creating the preferred scene reproductions.

Signal processing may be applied to two-dimensional or three-dimensional image representations which are still or moving. Signal processing can be done in the optical, digital, and chemical domains (Ref. 5–10). It is possible to use any or all of these techniques to achieve the preferred viewed reproduction, depending on the pathway for original scene capture parameters to preferred reproduction creation. For example, a 6×7 cm format camera can be used to capture original scene parameters with two dimensional color negative film. During the chemical development of the film, the developer works with the silver halide emulsion and incorporated image modifying couplers in the film to create a chemically enhanced optical representation in the negative of the scene in both sharpness and color. The negative can then be digitized by a CCD linear array in a Kodak Premier scanner to create a digital image of the scene. The digital image can then be transformed using the Premier workstation so that the desired preferred view reproduction will be created when a Premier output 4×5 negative film is optically printed onto 16×20 color negative paper after first creating an unsharp silver mask from the 4×5 negative. This example is fairly common for the use of the Kodak Premier system except that the sharpening is often done digitally by the workstation.

Signal processing may be performed by the camera as by electronic cameras, during film development as in the case of chemical processing, associated with the film scanning, in computers after captured images are pixelated, and as part of the final image generation process. The processing can occur in any single or any combination of the above categories.

Chemical Processing

Chemical processing is an inherent part of the development of silver halide imaging materials. During the image development step, the developer can work with the chemical agents incorporated in the film or introduced in the processing solution to enhance the recorded image affecting the tone, color, sharpness, and graininess of the resultant recorded image. These effects can also be introduced by using intermediate, internegative, and interpositive film in any number or combination of sequential steps with associated chemical development. For example, the original scene parameters can be captured in latent image in Kodak Lumiere color positive film in a 35 mm camera. During E-6 chemical processing of the film, the developer works with agents incorporated in the film to produce a sharpened and color enhanced film. The positive film image is then contact printed onto a color internegative film to reverse the image and alter the tone mapping of the color positive film recorded image and to correct some color inaccuracies in that recorded image. The internegative film image is then contact printed onto an intermediate film which alters the tone mapping of the recorded image so that when the intermediate film image is printed in a color enlarger onto Kodak Edge color paper, the preferred view reproduction is created along with sharpening and color enhancement.

The chemical enhancement and tone manipulation can be accomplished in the so called instant photography case in a concerted process. In instant photography, the latent image scene recording occurs during the camera exposure step. The exposed film is immediately or subsequently processed by a developer or developers incorporated into the film packaging. The developing process works with the exposed latent image representation of the original scene to create and alter the recorded information to produce the visual reproduction having the desired tone scale directly in the film emulsion layers or by migration of imagewise released colorant. This process can occur with or without enhancement of color or sharpness in the final image.

Optical Signal Processing

For original scene parameters which are recorded in a manner which has the exact spatial relationship between scene elements as in the original scene, such as a photographic film exposure, it is possible to do optical processing to achieve the desired visual reproduction as well as to enhance other characteristics of the captured image such as sharpness. For example, when the original scene parameters are captured on color negative film, the final visual reproduction is usually created by optically printing the negative, with an imaging lens or by contact, onto color negative paper. It is possible to use intermediate photographic materials to alter the original scene parameters to produce a preferred viewed reproduction. These intermediates include masks, both sharp and unsharp, which are generally used to adjust the tone reproduction and reproduction sharpness, as well as intermediate, internegative, and interpositive films which are used to adjust different scene parameters such as color, tone reproduction, and sharpness as well as to introduce special effects using blue matte and montage. These intermediate, internegative, and interpositive steps can be combined in any number and any order to achieve the desired film viewed image.

In addition, there are spatially varying optical processing effects which can be introduced during the non-contact printing step such as dodging and burning where different parts of the scene receive different amounts of exposure due to preferentially blocking the printing light beam between the film negative and paper. Ref. 1 contains a thorough treatment of these effects. It is recognized that while in the example given here the processing is done optically, all of these transformations can be effected digitally as well. These techniques can be effected manually using software packages like Adobe Photoshop.

Optical transformations affecting reproduction parameters can also include Fourier techniques to alter the appearance of the final viewed image as described in "Introduction to Fourier Optics", J. W. Goodman, McGraw-Hill, 1968. For example, it is very common to optically low pass filter an image before it impinges on a CCD sensor. Removing high frequency data prevents aliasing.

Digital or Analog Signal Processing

For pixelated images, it is possible to alter the captured scene parameters to produce desirable characteristics in the visual reproduction, including the preferred viewed tone reproduction. These transformations may be executed in a digital or analog mode depending on whether the image pixels are stored as digital or analog representations. The principals are the same although the mathematical treatment is different. Ref. 5-10 suggest a number of the techniques used in analog and digital processing.

The digital or analog processing can be executed imagewise or partial imagewise (piecewise) to achieve the desired final viewed image. Electronic processing can be done to a single image, several images, or to an entire set of images. The processing can be done separately by color record or as composite color record processing. Single or multi-dimensional look-up-tables of parameters (LUT's) can be used in the processing to facilitate the desired computations. Alternatively, simple or multi-dimensional matrices can be used in the computational processing as can mathematical expressions. Convolutions may also be incorporated during the processing.

Special transformations of the types just described are necessary to achieve the visual reproduction when using a half-tone printing procedure to create the final image.

Image representation compression and decompression may be involved in the digital or analog processing. The image representation may also be transmitted between different transformation agents during the processing procedure.

Digital or analog modes of electronic processing on pixelated recorded images can be effected on single capture scenes, or a series of captured scenes, or on a sequence of related captured scenes to produce the best image or images. It is often possible to create a more pleasing visual reproduction in terms of color balance by analyzing a series of captured scenes as taught by Ref. 20.

The most desirable electronic processing may be determined by an automatic, semi-automatic, user-selected, operator-interactive, or learning algorithm. To create the preferred viewed tone reproduction, a specific tone mapping must be incorporated in the algorithm based on the known tone mapping from the original scene to the input pixelated image representation and the tone mapping inherent in the print generation hardware and media during the final image generation process. However, other desirable electronic enhancements such as color and sharpness boosting may also be included in the electronic manipulation.

The most preferred visual reproductions of the original scenes will depend on the dynamic range of original scene. As taught by the tone mapping criteria in this application, the window of tone mappings provide the preferred representations of the original scene, but the most preferred tone mapping for the visual reproduction will fall within the prescribed boundaries, but its actual path may depend on the original scene. For example, hazy scenes will in general require a tone mapping near the upper boundary of the criteria for the most preferred reproductions, while brightly and clearly illuminated subject matter will in general require a tone mapping near the lower boundary of the criteria for the most preferred reproduction. Selecting the best tone mapping within the specified criteria will therefore require a classification algorithm.

Successful classification algorithms will take many forms, including but not limited to histograms, ranges, parameters based on the distribution, or transformations of the distribution of all or a subset of the recorded or transformed image pixel values. For example, one may define the dynamic range of the original scene by the log exposure density difference between the 5th and 95th percentile log exposure densities for the cumulative pixel log exposure density distribution. If the log exposure density difference is greater than 1.5, the best preferred viewed final image reproduction will have a mapping nearer the bottom of the defined preferred mapping window. If the difference is less than 1.5 the best preferred viewed final image reproduction will have a mapping nearer the top of the defined preferred mapping window.

In digital imaging printing systems, classification algorithms can be implemented to select slightly different tone mappings to create the most preferred images. The input for the classification can be scene parameters or capture conditions. It is thus possible to implement selected tone mappings to create the most preferred images during optical printing by using the typical coarse or fine print balance scanning or by using a preliminary scanning to obtain information to select from among two or more print materials having different densitometric characteristics. This process would require a printer with two or more print material transport systems. It is also possible to employ a single print material with densitometric characteristics that vary depending on some capture condition or controllable parameter such as temperature, exposure duration, light source, zoom status, etc. to produce the most preferable scene reproduction in a single print material printer. Naturally, both methods can be combined in multiple print material printers to produce a greater resolution in achieving the most desirable reproductions.

Information accompanying the captured original scene parameters that describes the camera parameters responsible for capturing the scene can provide useful input for the signal processing algorithms. Useful information includes any single or any combination of scene illumination type, flash parameters such as flash output and/or whether the flash was directed at the subject or bounced onto the subject and/or whether the sufficient flash power was available to properly illuminate the subject, camera lens f-stop, camera exposure time, scene orientation. This information may be used by the camera to optimize the exposure of the film or sensor as taught by Wheeler or Baumeister (Ref. 21 or 22) to produce the best scene capture for use by the signal processing step.

Another part of signal processing is the determination of the proper visual reproduction color balance. This is done for any kind of image to produce the most desirable representation. The final representation color balance may be determined by processing in the camera, scanner, processing computer, or viewed reproduction creation device. For typical photographic film processing, the scanning used to determine print color balance is not usually part of but can be a pixelation process used to produce an electronic image representation. Scene balance algorithms are discussed further in Ref. 23.

Rendering

Rendering is the act of transforming the input electronic, magnetic, or optical image representation to account for the scene parameter manipulation characteristics of the output device and media so that the desired viewed representation is created. Rendering can use chemical, magnetic, optical, electronic, or biological means to accomplish the desired transformation. Rendering can be part of signal processing, part of the final image forming process, or a separate step in the image reproduction forming process.

As an example of rendering, the result of standard PhotoCD signal processing of a scene derived by scanning a color negative film original capture of original scene parameters, plus additional processing may create a digital electronic representation of the preferred viewed image reproduction described herein. To produce a thermal dye transfer hardcopy representation of the electronic representation, the PhotoCD representation must be modified in a way which exactly compensates for the non-linear characteristics of the thermal dye transfer process. This includes generating an electrical version of the scene representation which will be applied to the thermal heating elements of thermal printing device to create the dye transfer. Since dye transfer efficiency is not a linear function of applied voltage to the heating elements, the electrical representation must account for this non-linearity to produce the desired preferred viewed scene reproduction. See Ref. 12 for a detailed discussion of rendering.

Step (3)—Creation of the Visual Reproduction

Conventional Optical Printing

The visual reproduction of the original scene can be generated by optically printing a photographic film onto silver halide photographic or other light-sensitive paper. The printing process can be additive or subtractive and the photographic materials can be negative or positive working (negative film with negative paper or positive film with positive paper). To achieve the preferred final viewed reproduction, the paper response characteristics must be accounted for in the film to be printed so that the resultant produced image has the desired tone reproduction characteristics. For more information on conventional optical printing, please see Hunt (Ref. 1). One suitable embodiment is to capture the original scene parameters with a 35 mm SLR using Kodak Gold+100 film. The film is exposed onto a positive working intermediate film designed to produce the preferred final print reproduction when printed onto Kodak Edge paper using a Kodak Create-a-print processor. The final preferred reproduction is created by printing the intermediate film onto Kodak Edge paper. It is also possible to print onto semi-transparent materials, such as Kodak Duratrans, or on transparent film designed for projection or illuminated display viewing.

Electronic Printing onto Light-Sensitive Materials

Silver halide photographic or other light-sensitive materials are conveniently used by electronic printing processes to produce high-quality reproductions. The light-sensitive material can be transparent film, reflective paper, or semi-transparent film. These materials are exposed by visible or infrared light derived from many different sources. The materials may be designed for typical photofinishing applications or they may be specially designed for digital printing applications, such as the paper which is used by specially designed three-infrared light printers manufactured by 3M Company. The photo-sensitive materials are respond primarily to three different spectral regions of incident light. Typically, these are red(600–720 nm), green (500–600 nm), and blue(400–500) light. However, any combination of three different spectral sensitivities can be used. These could include green, red, and infrared light or red, infrared 1, and infrared 2 light, or 3 infrared lights of different wavelengths. Or a material sensitive the three primary wavelengths of visible light may be false sensitized so that the color of the exposing light does not produce image dye of the complementary hue, such as red, green, and blue sensitivity producing magenta, yellow, and cyan dye, respectively. Printing can be effected by exposing all pixels sequentially, by exposing a small array of pixels at the same time, or by exposing all the pixels in the image at the same time.

Devices which can be used to print on light-sensitive materials include CRT, LED (Light Emitting Diode), LVT (Light Valve Technology), LCD, Laser, as well as any other controlled optical light generating device. See Ref. 2 for a full discussion of these devices. All these devices have the ability to expose 2 or more light sensitive layers in an Light-sensitive material to produce a colored image. They differ mainly in the technology on which the devices are based.

CRT printers use an illuminated phosphor screen which to expose photographic materials by contact or lens imaging. Typically, 3 colors of exposing light are exposed sequentially by using color filters to gain exposing light purity. The exposing process can be executed in a single step or any combination of steps. Examples of CRT printers include the AGFA Digital Print System and the KODAK PCD 6600 digital print system.

LED printers generally consist of 3 light emitting diodes of different wavelengths which are capable of selectively exposing 3 different color records in a photographic material. Examples of LED printers include early versions of the FUJI Pictography system.

Light valve technology (LVT) can be used to write pixelwise onto Light-sensitive materials. These devices are based on 2 or more colored light sources, such as filtered tungsten bulbs, the output of which is focused into a narrow beam and rapidly modulated by means of a light valve. A light valve is an optical material which changes refractive index radically when a voltage is applied. The filtered light selectively exposes different light-sensitive layers in the light-sensitive material. Examples of LVT printers include the Light Valve Technologies Model 1620B.

LCD devices can also be used to generate color pictorial electronic images which can be used to expose hardcopy photosensitive materials. Liquid crystal displays generally contain a sandwich of polarizers and the liquid crystals whose transmissivity is controlled electrically, although alternative technologies such as Raychem's dispersed liquid crystal materials function in a like manner without polarizers. Other alternate LCD technology applications are disclosed in "Field controlled light scattering from nematic microdroplets", Appl. Phys. Lett., 48, p27, 1986. The colored filters may be arrayed in small adjacent domains, or they may be arrayed depthwise (stacked) one above the other. The LCD controller typically sets/adjusts the red, green, and blue transmissivities associated with a single pixel appropriately to display the input color and brightness. This modulator of light can be used to expose light sensitive materials pixelwise to create the visual reproduction as described in Ref. 28.

Laser printers consist of two or more narrow emission lines derived from one or more lasers which selectively expose color sensitive layers in a light-sensitive material to produce a colored image. The lasers may be of any kind. Gas lasers are often used for high speed printers due to their high light output. An example of color laser printers include the FUJI Pictography 3000 printer which uses 2 infrared and 1 red laser diode to expose a specially sensitized paper.

Electronic Printing onto Non-Light-Sensitive Materials

Non-light-sensitive imaging materials are conveniently used by electronic printing processes to produce high-quality reproductions. The printing process can be based on many technologies. The method of image formation can be half-tone, continuous tone, or complete material transfer. The imaging material can be transparent film, reflective paper, or semi-transparent film. The materials can be written on to produce pictorial images by thermal dye transfer, ink jet, wax, electrophotographic, or any other technique which writes pixelwise. These processes use two or more colorants to create colored pictorial representations of pictorial scenes. The colorants may be dyes, toner, inks, or any other permanent or semi-permanent colored material. See Ref. 2 for a detailed discussion of this kind of printing.

Thermal dye transfer printing is based on the transfer of dyes by pixelwise heating. A thermal printer consists of a controller capable of receiving pixelated image information and controlling the machine in a way which creates a colored image pixelwise as required by the input information, a mechanism to create heat pixelwise, 2 or more dye materials of different hues which can be transferred to the imaging material based on the amount of heat applied, and an imaging material which absorbs or adsorbs the imaging dyes in a controlled manner. The heat may be generated electrically by resistive or other heating elements, by light absorption, or by any other process which generates heat. The printing device may create images by writing pixels individually, by row, or by area. A suitable embodiment for pictorial imaging is the Kodak XL7700 thermal dye transfer printer which uses a resistive head to sequentially transfer a row of pixels at a time from 3 dye-containing thin films (cyan, magenta, and yellow) to a reflective paper receiver. Ref. 2 provides more details.

Ink jet printing uses 2 or more sources of pigments or dyes dispersed in a solvent (inks) to produce a pictorial image on a receiver sheet (reflective paper, transparent film, or semi-transparent film). The pigments are transferred to the imaging material by microdrops pixelwise by using ultrasonic, piezo-electric, or other mechanisms. The final image can be created by sequential applications of individual pixels, by rows of pixels, or by an array of pixels applied together. Suitable embodiments for ink jet printers are the Hewlett Packard HP1200C and the Canon CJ10.

Wax printing is based on the transfer of dyes by pixelwise heating. The transfer is typically done using a half-tone process. A wax printer consists of a controller capable of receiving pixelated image information and controlling the machine in a way which creates the wax pixelwise required by the input information, a mechanism to create heat pixelwise, 2 or more wax pigment materials of different hues which can transferred to the imaging material based on the amount of heat applied, and an imaging material which absorbs or adsorbs the imaging dyes in a controlled manner. The heat is generally produced electrically by resistive elements but can be produced by any other process which generates heat. The printing device may create images by writing pixels individually, by row, or by area. A suitable embodiment is the Tektronix Phaser 200 printer which uses a resistive head to sequentially transfer a row of pixels at a time from 4 wax-containing thin films (cyan, magenta, yellow, and black) to a reflective paper receiver. Ref. 27 provides further derails.

Electrophotographic printing relies on pixelwise electrostatic application of colored toner particles. Two or more hues of toner particles must be applied sequentially to create a color pictorial image. A photoconductor is exposed sequentially for each color record to be written. After each exposure, the photoconductor picks up toner in proportion to the exposure due to the charge attraction between toner particles and the photoconductor. The toner is then transferred to the paper and fused to the paper with heat and pressure. A suitable embodiment for an electrophotographic printer is the Canon CLC500.

Graphic Arts printers for pictorial imaging generally use half-tone printing. These devices use 4 or more inks applied sequentially to produce continuous appearing images. A suitable embodiment for graphic arts applications is the KODAK Approval digital color proofer which uses lasers to locally heat and transfer 4 dyes to a receiver sheet. A halftone process is used in this device. For low volume printing, electrophotographic processes are frequently used. An example is the KODAK Color Edge Copier System. These electrophotographic prints can use 3 or more inks.

Electronic Soft Display

In addition to hardcopy viewed images, it is also possible to create projected images which have the same preference over previously generated pictorial images. Many technologies are appropriate for this kind of image generation. All these techniques rely on producing color images with 2 or more colored lights. These are typically red, green, and blue in nature although they can be any set of primaries as described in Hunt (Ref. 1). Devices which can be used to create the preferred viewed reproduction include CRT, LCD, EL (Electro-Luminescence), LED, light bulbs, lasers, plasma display panels, or any other 2 or more colored lighting apparatus capable of pixelwise illumination. The images can be created by display within the device, projection, or backlighting. Many devices create an image on a screen or display area which is physically a part of the mechanical unit. However, images can be also be created by optically projecting the image in the form of light rays from behind or in front of the viewer toward a screen which is in front of a viewer or by projecting a reversed image toward the viewer onto a screen between the viewer and the projecting device.

CRT display uses two or more phosphors which are excited pixelwise by an electron beam. CRT tubes consist of one or more electromagnetically controlled electron beams of small (pixel) size which are displaced spatially and whose intensity is modulated to create a pictorial image by selectively exciting red, green, and blue phosphors coated on a screen at one end of the tube. The incidence of the beam onto the phosphor coating is controlled by a mask so that the red, green, and blue phosphors are generally illuminated by the red, green, and blue electron beam controllers. For more information on CRT devices, see Ref. 13, 28. A suitable embodiment is a Sony Trinitron CRT.

LCD devices can also be used to generate color pictorial electronic images. Liquid crystal displays generally contain a sandwich of polarizers and the liquid crystals whose transmissivity is controlled electrically, although alternative technologies such as Raychem's dispersed liquid crystal materials function in a like manner without polarizers. Systems described in "Field Controlled Light Scattering from Nematic Microdroplets", Appl. Phys. Lett., 48, p27, 1986, may be employed. The colored filters may be arrayed in small adjacent domains, or they may be arrayed depthwise (stacked) one above the other. The LCD controller typically sets/adjusts the red, green, and blue transmissivities associated with a single pixel appropriately to display the input color and brightness. This modulator of light can be used to expose light sensitive materials pixelwise to create the preferred viewed reproduction. The LCD may be as described in Ref. 13, 28, and a suitable embodiment is a Sharp LCD screen.

LED technology can be used to generate pictorial images by projecting 3-color images. LED display devices generally consist of 3 light emitting diodes of different wavelengths, typically red, green, and blue. An example of an LED display is the emissive display by Planar Corp.

Plasma technology can also be used to generate pictorial images. Plasma screens have pixels composed of gas-filled cells. A voltage is applied variably to each cell to produce light. These kinds of devices are often composed of UV-plasma generating cells also containing a visible light phosphor of the desired color. For color images, three different colored phosphors are used in the cells composing the screen. An example of a plasma display is the IBM monitor.

PREFERRED EMBODIMENTS

Photographic Film/Optical Printing/Photographic Paper

One of the suitable methods and systems for achieving the preferred viewed hardcopy reproduction uses silver halide color negative film in a conventional camera to capture the original scene parameters (step 1 in the process). The preferred film has densitometric characteristics similar to color negative films used in the marketplace today, having an extended log response region in which density varies linearly with scene log exposure to accommodate over and under film exposure. An additional desirable feature of the preferred film is that it offer strong color enhancement during the chemical development process to produce bright, vivid colors in the final printed image. The transformation step (step 2) is incorporated into the photographic paper sensitometric response so that optical printing of the color negative film onto the color photographic paper (step 3) produces the preferential tone mapping of the preferred viewed reproduction. In this embodiment, steps 2 and 3 are combined into a single event, requiring a specially prepared color paper response function.

Photographic Film/Digitization/Transformation/Digital Printing

Another suitable method and system for achieving the preferred viewed hardcopy reproduction also uses silver halide color negative film in a conventional camera to capture the original scene parameters (step 1 in the process). After film chemical development, the film is scanned to produce a digital representation of the original scene parameters. Suitable scanning is achieved using a KODAK PhotoCD TM scanner.

The digitized image can be stored in this form or the digitized image can be further processed to produce a standard format image, such as that effected by the KODAK PhotoCD TM system, before storing. The KODAK PhotoCD provides a suitable storage mechanism, although other optical, magnetic, magneto-optical, or other storage modes are equally effective. Furthermore, the digitized image can be transformed into the preferential tone mapping of the reproduction, either before or after storage. The preferred method for maintaining fidelity to the original scene capture is storage of the original scene capture parameters. For standardization of images from various sources, the KODAK PhotoCD pathway is suitable, storing the digital images after modification to a standard format. In most cases, it is preferred to apply the transformation (step 2) after the digitized image has been stored since this procedure offers the greatest flexibility to create the desired "preferential tone mapping", which is usually scene dependent.

After original scene parameter capture and image digitization, the image is transformed in step 2 to create the preferred viewed hardcopy image in digital form. This is accomplished based on the densitometric characteristics of the film and the flare characteristics of the camera used in the scene capture. The most preferred transformation will use information contained in the captured scene parameters to determine if the original scene had low, medium, or high dynamic range, and will then produce the most preferred reproduction based on a path through the "preferential tone mapping" region near the top boundary, through the center, or near the bottom boundary, respectively.

While implementing step 3, a rendering correction is applied to the transformed digital image, accommodating the idiosyncrasies of the printer and the printing material, before generating the hardcopy through digital printing. A suitable hardcopy generation step involves color photographic paper, imprinted by a 3-color CRT printer or a 3-color laser printer. These two light-based printing processes offer great speed and very high quality hardcopy images. Any other printing process, such as thermal, wax, ink jet, etc. can also be effective in creating high quality images.

Digital Image Capture/Transformation/Digital Printing

A third suitable method to achieve the claimed preferred viewed hardcopy reproduction uses an electronic digital imaging camera to capture the original scene parameters (step 1 in the process). An example of such a camera is the KODAK DCS electronic camera which captures a scene with a solid state full frame photocapacitor CCD sensor and buffers the image in electronic RAM and stores the image on a magnetic hard disk located in the camera.

The image data in camera RAM may be transmitted and then stored on media, such as magnetic tape, optical disk, magnetic disk, magneto-optical disks, etc.. The digital scene parameters can be stored in this form or the image can be further processed to produce a standard format image, such as that effected by the KODAK PhotoCD system, before storing. The KODAK PhotoCD is suitable as the storage mechanism, although other optical, magnetic, magneto-optical, or other storage modes are equally effective. Furthermore, the digitized image can be transformed into the preferential tone mapping for the reproduction either before or after storage. The preferred method for maintaining fidelity to the original scene capture is storage of the original scene capture parameters. For standardization of images from various sources, the KODAK PhotoCD pathway is most suitable, storing the digital images after modification to a standard format. In most cases, it is preferred to apply the transformation (step 2) after the digitized image has been stored since this procedure offers the greatest flexibility to create the most preferred tone mapping within the claimed window, which is usually scene dependent.

After original scene parameter capture and image digitization, the image is transformed in step 2 to create the preferred viewed hardcopy image in digital form. This is accomplished based on the response characteristics of the electronic camera and the flare characteristics of the camera used in the scene capture. The preferred transformation will use information contained in the captured scene parameters or capture conditions to classify the "preferred tone mapping" to be used (e.g. whether the original scene's dynamic range was low, medium, or high) and will then produce the most preferred reproduction based on a path through the defined preferential tone mapping region near the top boundary, through the center, or near the bottom boundary, respectively.

While implementing step 3, a rendering correction is typically applied to the transformed digital image, accommodating the idiosyncrasies of the particular printer and the printing material, before generating the hardcopy through digital printing. A suitable hardcopy generation step involves color photographic paper, imprinted by a 3-color CRT printer or a 3-color laser printer. These two light-based printing processes offer great speed and very high quality hardcopy images. Other printing process, such as thermal, wax, ink jet, etc. can be equally effective in creating high quality images.

Figure 13:
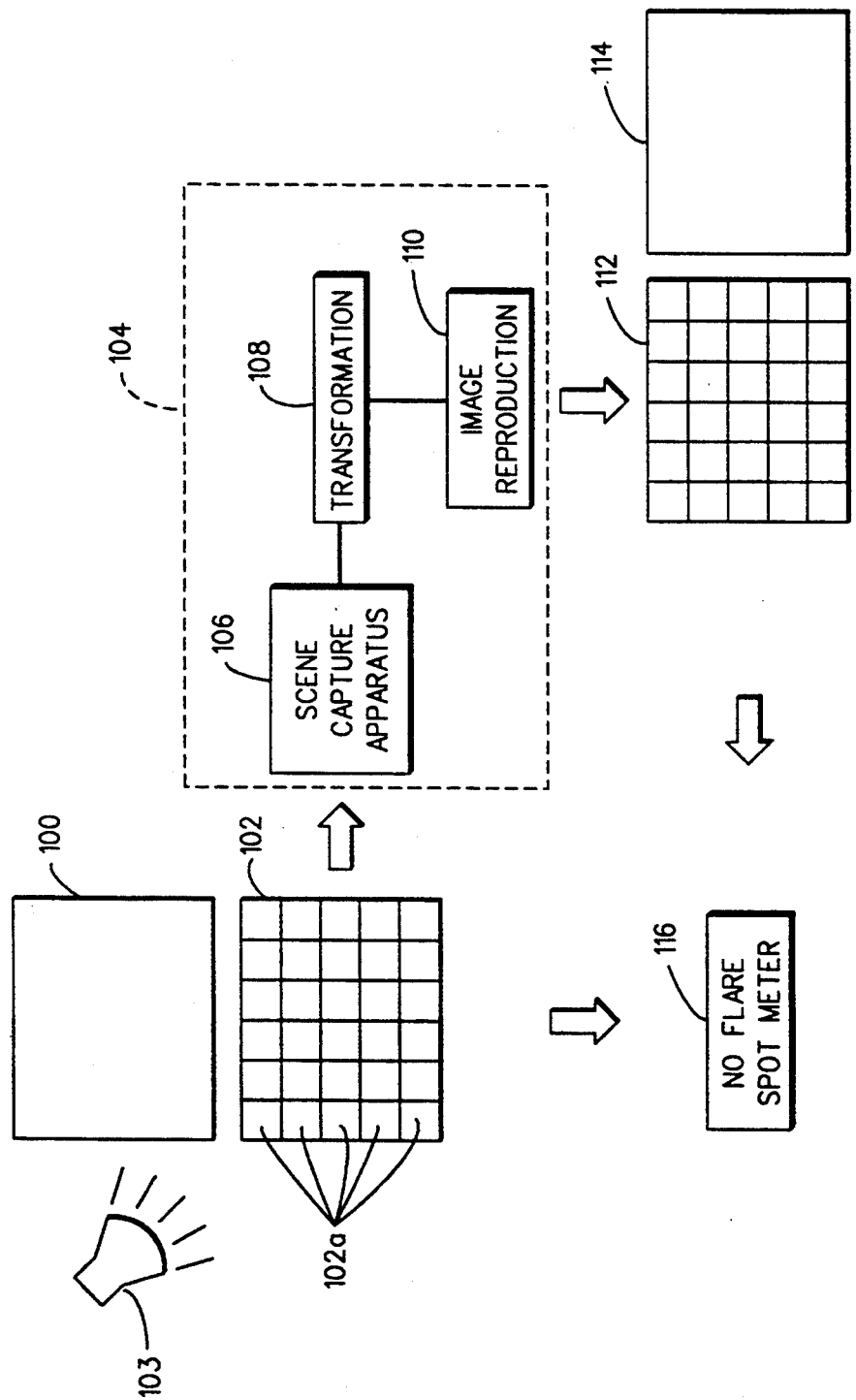
FIG. 13 is a schematic illustration of a test arrangement for mapping tone reproduction of a scene image reproduction system.

A test procedure for determining the tone reproduction of an image reproduction system in the case of hardcopy reflection prints will be described in reference to FIG. 13. In this test procedure, two test targets 100, 102 of uniform size are provided. Target 100 is a spectrally uniform gray, i.e. exhibits constant percent reflectance (20%) in a wavelength spectrum of from 380 nm to 780 nm. Target 102 is the same as target 100 except for the provision of a series of uniform gray stepped density areas 102a spanning the range from approximately 0.0 optical density (100% lambertian diffuser) to 1.80 optical density in increment of 0.10 or finer. Each density step is spectrally uniform and is large enough to allow for easy measurement. Both targets are large enough so that when photographed as described below, each target substantially fills the image capture area of the capture device.

A lighting system 103 is provided to uniformly illuminate the targets, mounted on a uniform gray (20% reflectance) background, at approximately a 45° angle of incidence. The lighting should provide reasonably specular illumination typical of high quality, low flare viewing conditions. The spectral quality of the lighting should be similar to that for which the imaging system under test is designed. Under constant illumination conditions from lighting system 103 and with a scene capture apparatus 106, e.g. a photographic camera, oriented perpendicularly to the targets, each of the target images is captured according to ISO standards for the image capture device. Additionally, the absolute visual densities of each density step in target 102 and the corresponding area of target 100 are measured using a very low flare radiometer. Each measurement is made with a spot size one-fourth as large as the density step area being measured. Using identical lighting, image device and radiometer conditions, target 100 is captured and measured as described above.

Using the imaging system 104 under analysis including scene capture apparatus 106 and image reproduction stage 110 and having an overall transformation characteristic represented by transformation box 108, a hardcopy reproduction of the target images is produced by image reproduction stage 110. The reproduction is made in such a manner that a 1.0 scene density relative to a 100% diffuse reflector is reproduced at a density of 1.0.

Figure 5:
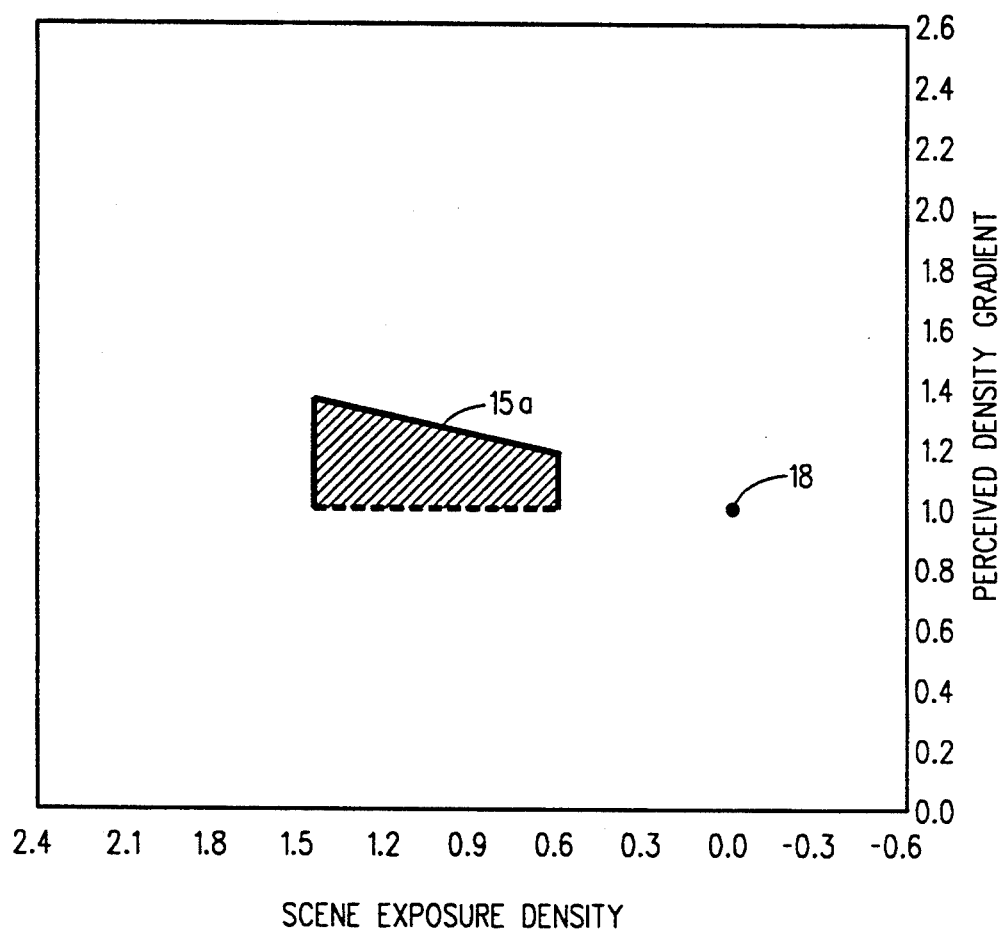
FIGS. 5–7 are graphs of boundary conditions for scene image reproduction instantaneous gamma characteristics that are useful in explaining and defining the parameters of the present invention.

The reproduced prints are uniformly illuminated with lighting system 103 at a 45° angle of incidence and the visual step densities are measured with the very low flare radiometer 116. It will be appreciated that the targets and reproductions preferably are illuminated and measured under identical conditions. After correcting the measured step densities on the target 102 for any target illumination non-uniformity using the target 100 densities in the same location as the target 102 steps and after correcting the measured step densities on target 112, the reproduction of target 102, for any target illumination non-uniformity, any field exposure non-uniformity by the scene capture apparatus 106 onto the film or sensor and any field exposure non-uniformities present in the hardcopy image reproduction apparatus 116 using target 114, reproduction of the target 100, densities in the same location as the target 102 steps and using the print through tone reproduction D-LogE function, the measured hardcopy step density versus the target step density function are plotted on a density versus scene density graph along with the instantaneous gamma of this curve. This is preferably done by accurately fitting the data points with a mathematical spline function to obtain the D vs LogE curve and calculating the first derivative of the fitted curve to get the instantaneous gamma function. The resulting plotted functions are then observed and analyzed as shown in FIGS. 5–7.

To test the tone reproduction of video images or projected images viewed in darkened environments, the targets are captured and measured as described above. The images are then reproduced as the intended video or projected images and then measured with a radiometer as described above except using the viewing environment typical for image viewing for the system being tested with no additional lighting. Correction are then applied for the display hardware field non-uniformity using the photographed (captured) gray target. Plotting and analysis of the resulting D-LogE and instantaneous gamma functions then proceeds as described above except comparison to the parameter of the invention are made using the equivalent adjusted boundary conditions and 100% scene white point as described earlier.

The invention has been described in detail with particular reference to a presently preferred embodiment, but it will be understood that variations and modifications can be effected within the scope of the invention as set forth in the appended claims.

What is claimed is:

1. A method of presenting a reproduction of an original scene in color with a preferential tone mapping, the method including the steps of capturing original scene parameters and creating a visual reproduction of the scene, the method additionally comprising:

performing a transformation of said captured scene parameters, said transformation being such that, taken in conjunction with untransformed characteristics of the capturing and creating steps, it results in a reproduced tone mapping having instantaneous gamma values of viewed reproduction density relative to density of the original scene which are greater than a minimum value of A and less than A plus 0.35 times scene exposure density over a scene exposure density range of from 0.60 to 1.45 as measured relative to a zero density, 100% diffuse reflector in the original scene, the instantaneous gamma values within scene exposure density range further lying entirely within a range of values subtended by an angle of 14° measured from a reference point at 0.0 scene exposure density and a viewed reproduction density gradient of A, wherein A is 1.0 in the case of direct view reflection media reproduction, 1.1 in the case of self-illuminated reproduction for viewing with ambient surround, and 1.3 in the case of a reproduction for viewing with dark surround.

2. The method of claim 1 wherein said capturing step comprises exposing said original scene parameters onto photographic positive or negative film having said scene parameters transformation embodied in the film.

3. The method of claim 1 wherein said creating step comprises reproducing said scene on positive or negative media to be viewed, said media having said scene parameters transformation embodied therein.

4. The method of claim 3 in which said media is to be viewed by reflection.

5. The method of claim 4 in which said media consists of silver halide based photographic print paper.

6. The method of claim 1 in which said capturing step comprises exposing original scene parameters onto photographic film and wherein said method further comprises the steps of (a) optoelectronically scanning said film to produce image pixel density-representative signals and (b) adjusting the amplitudes of said pixel signals in accordance with said scene parameter transformation.

7. The method of claim 6 wherein said pixel signals after transformation are applied to one or more types of viewable output media for creation of said visual reproduction, said output media types comprising (a) non-silver-halide-based photographic reflection print paper, (b) silver-halide-based photographic reflection print paper, (c) self-illuminated image reproduction device and (d) transparent or semi-transparent transmission media.

8. The method of claim 1 wherein different regions of preferential tone mapping of said instantaneous gamma values subtended by said angle exist between said minimum and maximum values and said creating step includes a step of classifying said scene to be reproduced and a step of selecting a region of said instantaneous gamma according to the classification of said scene to be reproduced.

9. The method of any one of claims 1 through 8 wherein the visual reproduction is a self illuminated image to be viewed with ambient surround and $A=1.1$.

10. The method of any one of claims 1 through 8 wherein the visual reproduction is to be viewed with a dark surround and $A=1.3$.

11. The method of claim 1 wherein said capturing step comprises exposing the original scene parameters onto photographic film.

12. The method of claim 11 wherein the film contains a light-sensitive silver halide emulsion.

13. The method of claim 12 wherein the film is negative or positive working.

14. The method of claim 12 wherein the film is semi-reflective film or reflective paper.

15. The method of claim 11 wherein the film is a scan-only film not designed for viewing.

16. The method of claim 11 wherein the film is instant film designed for instant development.

17. The method of claim 11 wherein the film contains at least one non-photo sensitive information carrying layer.

18. The method of claim 17 wherein said information carrying layer is a magnetic layer.

19. The method of claim 1 wherein the image is captured by a two- or three-dimensional camera.

20. The method of claim 12 wherein the image captured is subjected to development.

21. The method of claim 11 wherein the image formed on said film is subsequently scanned to read out the image.

22. The method of claim 11 wherein the film is a reversal film.

23. The method of claim 1 wherein said capturing step comprises exposing the original scene parameters to electronic sensors, photomultiplier tubes or storage phosphors.

24. The method of claim 23 wherein said sensors comprise electronic sensors.

25. The method of claim 24 wherein said sensors are charge coupled device (CCD) sensors.

26. The method of claim 1 wherein the captured scene parameters are magnetically, optically, electronically, chemically, or biologically stored, before or after transformation.

27. The method of claim 23 wherein the scene parameters are captured by a two- or three-dimensional camera.

28. The method of claim 1 wherein the capturing step includes forming a representation of the original scene and thereafter obtaining information related to the scene parameters from the representation rather than from the original scene.

29. The method of claim 28 wherein said representation is a negative photographic element of the original scene.

30. The method of claim 28 wherein said representation is a self-illuminated display.

31. The method of claim 28 wherein said representation is a computer simulation.

32. The method of claim 28 wherein the representation is a photographic intermediate.

33. The method of claim 28 wherein the representation is a photographic internegative.

34. The method of claim 28 wherein the representation is a photographic interpositive.

35. The method of claim 28 wherein the representation is a on a reflective media.

36. The method of claim 1 wherein the capturing step includes the step of classifying said original scene based on a scene parameter or capture condition.

37. The method of claim 36 wherein said classifying is based on the scene parameter of contrast range.

38. The method of claim 36 wherein said classifying is based on the capture condition of light source.

39. The method of claim 36 wherein said classifying is based on the capture condition of exposure time.

40. The method of claim 36 wherein said classifying is based on the capture condition of a zoom lens status.

41. The method of claim 36 wherein said classifying is based on optically scanning a representation of the original scene.

42. The method of claim 28 wherein the capturing step includes imagewise exposing a photographic film having a magnetic layer thereon, on which is recorded capture condition information.

43. The method of claim 1 wherein the captured scene parameters are stored, before or after transformation.

44. The method of claim 43 wherein the captured parameters are stored in analog form.

45. The method of claim 43 wherein the captured parameters are stored in digital form.

46. The method of claim 45 wherein the captured parameters are stored by optically reading a nonelectronic representation of the original scene and converting the resulting signal to electronic form.

47. The method of claim 43 wherein the captured parameters are stored in an optically readable form, either before or after the transforming step.

48. The method of claim 47 wherein the captured parameters are stored on a compact disc.

49. The method of claim 43 wherein the parameters are stored in magnetically readable form.

50. The method of claim 49 wherein the parameters are stored on a memory card.

51. The method of claim 49 wherein the parameters are stored on a magnetic hard drive.

52. The method of claim 49 wherein the parameters are stored on a magneto-optical drive.

53. The method of claim 1 wherein analog or digital electronic signals are used to capture and/or store the original scene parameters.

54. The method of claim 53 wherein said signals are converted between analog and digital form or vice versa.

55. The method of claim 54 wherein said signals are converted by sigma-delta modulation, parallel comparator, integrating converters, successive approximation, dual slope, or binary counting with error feedback.

56. The method of claim 53 wherein the digital levels are sufficient to distinguish at least 256 levels of gray.

57. The method of claim 1 wherein the transformation step comprises a chemical alteration of the original scene parameters.

58. The method of claim 57 wherein the transformation step comprises a chemical alteration of the original scene parameters during the processing of photographic film used to capture the original scene parameters.

59. The method of claim 57 wherein the transformation step comprises the formation of an internegative, interpositive, or other intermediate representation in combination with chemical alteration of the original scene parameters or those of a representation of the original scene parameters.

60. The method of claim 57 wherein the transformation step comprises an instant developer chemical which alters the parameters of the scene as originally captured.

61. The method of claim 57 wherein the transformation step is performed digitally in a camera employed in the capturing step.

62. The method of claim 1 wherein the transformation step comprises optical processing.

63. The method of claim 62 wherein the transformation step comprises modification of digital or analog signals.

64. The method of claim 1 wherein the transforming step is performed in a camera.

65. The method of claim 1 wherein the transforming step is performed as part of the process of creating a direct view visual reproduction.

66. The method of claim 65 wherein the process of creating said direct view visual reproduction comprises an optical printing step.

67. The method of claim 63 wherein the transforming is performed in a camera either before or after storage in the camera.

68. The method of claim 63 wherein the transforming step is performed either before or after storage by a computer.

69. The method of claim 1 wherein the transformation step comprises a classification step which determines the desired tone mapping boundaries for a particular scene within the overall boundaries of the invention.

70. The method of claim 69 wherein said classification is made on the basis of the range of exposures in the captured scene parameters in the original scene.

71. The method of claim 69 wherein said classification is made on the basis of the distribution of exposures in the captured scene parameters in the original scene.

72. The method of claim 71 wherein said classification is made on the basis of a frequency distribution of pixel exposure values in the captured scene parameters in the original scene.

73. The method of claim 69 wherein said classification is accomplished by a predetermined algorithm which affects the manner in which the tone scale parameters are altered.

74. The method of claim 69 wherein said classification is accomplished by a predetermined algorithm which chooses between two or more visual reproduction print media having different densitometric characteristics.

75. The method of claim 74 wherein said classification is accomplished by a predetermined algorithm which alters the densitometric characteristics of a visual reproduction media.

76. The method of claim 69 wherein said classification is based on a capture condition.

77. The method of claim 69 wherein said classification is based on the results of scanning a representation of the original scene.

78. The method of claim 69 wherein said classification is based on digitally captured scene parameters.

79. The method of claim 1 wherein rendering is performed to modify the original scene parameters to take into account the manipulative characteristics of a particular device for producing a viewable reproduction.

80. The method of claim 79 wherein said rendering is suitable for the production of a conventional optically printed reflective color print.

81. The method of claim 79 wherein said rendering is suitable for the production of a thermal dye-transfer hardcopy print.

82. The method of claim 79 wherein said rendering is suitable for the production of an ink jet produced hardcopy print.

83. The method of claim 79 wherein said rendering is suitable for the production of a wax hardcopy print.

84. The method of claim 79 wherein said rendering is suitable for the production of an electrophotographic hardcopy print.

85. The method of claim 1 wherein the visual reproduction is created in using at least one process selected from the group consisting of optical reproduction, thermal dye-transfer, ink jet, wax, and electrophotographic printing.

86. The method of claim 1 wherein the visual reproduction created is a reflective color print.

87. The method of claim 1 wherein the visual reproduction created is a thermal dye-transfer print.

88. The method of claim 1 wherein the visual reproduction created is a self-illuminated image to be viewed with ambient surround.

89. The method of claim 1 wherein the visual reproduction created is to be viewed with a dark surround.

90. The method of claim 1 wherein the visual reproduction is a transparent or semitransparent film.

91. The method of claim 1 wherein the visual reproduction is a reflective color print produced by dye diffusion.

92. The method of claim 1 wherein the visual reproduction is an LCD image.

93. The method of claim 1 wherein the method of image formation in the visual reproduction is half-tone, continuous tone, or complete material transfer.

94. The method of claim 1 wherein the visual reproduction is an LED image.

95. The method of claim 1 wherein the visual reproduction is a CRT image.

96. The method of claim 1 wherein the original scene is captured as an image on a photographic film, the film image is optically scanned to produce electronic signals, either before or after development, the resulting electronic signals processed to transform the signals to the desired parameter for preferential tone scale, and the resulting signals used to create a visual reproduction which is (1) for direct view, (2) self illuminated for viewing with ambient surround or (3) for viewing with dark surround.

97. The method of claim 96 wherein the film on which the original scene parameters are captured is subjected to color negative processing.

98. The method of claim 96 wherein the film on which the original scene parameters are captured is subjected to color reversal processing.

99. The method of claim 96 wherein the signals represent a digitized version of the scene parameters.

100. The method of claim 1 wherein the original scene is captured as an image on a photographic film which is developed and then optically printed on a photographic media for direct viewing which media includes chemicals for transforming the tone mapping into the preferential tone mapping for creating the preferred reproduction.

101. The method of claim 97 or 98 wherein the visual reproduction is one for direct viewing.

102. The method of claim 97 or 98 wherein the visual reproduction is self illuminated for viewing with ambient surround.

103. The method of claim 97 or 98 wherein the visual reproduction is for viewing with dark surround.

104. The method of claim 103 wherein the capture, transformation, and reproduction steps are conducted in rapid sequence to provide an instant reproduction.

105. The method of claim 104 wherein the transformation is accomplished by chemical reaction.

106. The method of claim 104 wherein the transformation is accomplished electronically.

107. The method of claim 1 wherein the capture, transformation, and reproduction steps are conducted in rapid sequence to provide an instant reproduction.

108. The method of claim 1 wherein the original scene is captured by exposing the original scene parameters to electronic sensors, the resulting electronic signal processed to transform the signals to the desired parameters for preferential tone scale, and the resulting signals used to create a reproduction which is (1) for direct view, (2) self illuminated for viewing with ambient surround or (3) for viewing with dark surround.

109. The method of claim 96 wherein the scene is captured on photographic film which is then subjected to negative processing.

110. The method of claim 109 wherein the reproduction created is one for direct view.

111. The method of claim 109 wherein the reproduction created is a self-illuminated for viewing with ambient surround.

112. The method of claim 110 wherein the reproduction created is for viewing with dark surround.

113. The method of claim 96 wherein the scene is captured on photographic film which is then subjected to reversal processing.

114. The method of claim 113 wherein the reproduction created is one for direct view.

115. The method of claim 113 wherein the reproduction created is a self-illuminated for viewing with ambient surround.

116. The method of claim 113 wherein the reproduction created is for viewing with dark surround.

117. The method of claim 1 wherein the transformation is performed as part of the capturing step.

118. The method of claim 1 wherein the transformation is performed after the capturing step and before a step of storing scene parameters.

119. The method of claim 1 wherein the transformation step is performed after a step of storing scene parameters and before creating the reproduction.

120. The method of claim 1 wherein the transformation step is performed as part of the step of creating the reproduction.

121. The method of claim 1 wherein the transformation step is a separate step performed between the step of capturing the original scene parameters and the step of creating the visual reproduction.

* * * * *